United States Patent
Ramasubramonian et al.

(10) Patent No.: US 12,425,658 B2
(45) Date of Patent: Sep. 23, 2025

(54) PREDICTIVE GEOMETRY CODING FOR POINT CLOUD COMPRESSION

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/629,517

(22) Filed: Apr. 8, 2024

(65) Prior Publication Data

US 2024/0348832 A1   Oct. 17, 2024

Related U.S. Application Data

(60) Provisional application No. 63/496,656, filed on Apr. 17, 2023.

(51) Int. Cl.
*H04N 19/70* (2014.01)
*H04N 19/124* (2014.01)
*H04N 19/157* (2014.01)
*H04N 19/169* (2014.01)
*H04N 19/597* (2014.01)

(52) U.S. Cl.
CPC .......... *H04N 19/70* (2014.11); *H04N 19/124* (2014.11); *H04N 19/157* (2014.11); *H04N 19/169* (2014.11); *H04N 19/597* (2014.11)

(58) Field of Classification Search
CPC .............. H04N 19/124; H04N 19/157; H04N 19/169; H04N 19/597; H04N 19/70
USPC ....................................... 375/240.03
See application file for complete search history.

(56) References Cited

U.S. PATENT DOCUMENTS

2024/0185466 A1* 6/2024 Taquet .................... G06T 9/004

FOREIGN PATENT DOCUMENTS

WO    WO-2024214442 A1 *  10/2024

OTHER PUBLICATIONS

International Search Report and Written Opinion—PCT/US2024/024633—ISA/EPO—Jul. 15, 2024 (11 pp).

(Continued)

*Primary Examiner* — Kathleen M Walsh
(74) *Attorney, Agent, or Firm* — Shumaker & Sieffert, P.A.

(57) ABSTRACT

A method of processing a point cloud includes determining that angular mode is enabled for encoding or decoding a current point of points in the point cloud, and parsing or signaling information for an azimuthal angle residual value for the current point independent of a radius value of the current point or a radius value of a previous point of the point cloud that is previous to the current point in decoding order. The azimuthal angle residual value is based on a difference between an azimuthal angle value of the current point and a predictor azimuthal angle value of the current point, and the azimuthal angle value of the current point is indicative an azimuthal angle of the current point based on a laser used to capture the points of the point cloud.

20 Claims, 28 Drawing Sheets

---

2200 — DETERMINE THAT ANGULAR MODE IS ENABLE FOR ENCODING OR DECODING CURRENT POINT OF POINTS IN POINT CLOUD

2202 — PARSE OR SIGNAL INFORMATION FOR AZIMUTHAL ANGLE RESIDUAL VALUE FOR CURRENT POINT INDEPENDENT OF RADIUS VALUE OF CURRENT POINT OR RADIUS VALUE OF PREVIOUS POINT OF POINT CLOUD THAT IS PREVIOUS TO CURRENT POINT IN DECODING ORDER

(56) References Cited

OTHER PUBLICATIONS

Ramasubramonian (Qualcomm) A.K., et al., "[G-PCC][New] Removing Parsing Dependence in Predictive Geometry Coding", 142. MPEG Meeting, Apr. 24, 2023-Apr. 28, 2023, Antalya, (Motion Picture Expert Group OR ISO/IEC JTC1/SC29/WG11), International Organisation for Standardisation, Organisation Internationale De Normalisation3252/IEC, Coding of 3D Graphics and Haptics, No. m63252, 4 Pages, Apr. 19, 2023, XP030310358, The whole document.

WG 7 MPEG 3D Graphics and Haptics Coding: "G-PCC 2nd Edition Codec Description", 141. MPEG Meeting, Jan. 16, 2023-Jan. 20, 2023, Online, (Motion Picture Expert Group OR ISO/IEC JTC1/SC29/WG11), No. n22421, International Organization for Standardization Organisation Internationale De Normalisation, Apr. 10, 2023, 83 pages, XP030308576, Sections 3.3.1, 3.6.1, Figures 10, 11, 65.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

\* cited by examiner

◒ Root vertex

◯ Branch vertex with 1 child

⊕ Branch vertex with 2 children

◔ Branch vertex with 3 children

◉ Leaf vertex

PREDICTIVE GEOMETRY CODING FOR POINT CLOUD COMPRESSION

This application claims the benefit of U.S. Provisional Patent Application 63/496,656, filed Apr. 17, 2023, the entire content of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for predictive geometry coding for point cloud compression. This disclosure describes examples in which parsing or signaling information for an azimuthal angle residual value for a current point of a point cloud is independent of a radius value of the current point or a radius value of a previous point of the point cloud that is previous to the current point in decoding order. For instance, whether a point cloud encoder signals or a point cloud decoder parses the information for the azimuthal angle residual value for the current block may not be conditional on the radius value of the current point or the radius value of a previous point of the point cloud.

In some techniques, parsing of the azimuth residual value required the reconstructed value of the radii of the preceding point(s). Accordingly, in some of these techniques, there is a dependence of the parsing of syntax elements on the reconstruction of the points. With the example techniques described in this disclosure, by parsing or signaling the azimuth residual value independent on the values of reconstructed syntax elements (e.g., radius value of the current point or radius value of a previous point), the example techniques may improve the parsing process. For instance, parsing of the azimuth residual value may be able to occur in parallel or may not need to wait with determination of the radius value of the current point or the radius value of a previous point, which in turn may decrease the time needed for decoding, and thereby improve the overall operation of point cloud compression.

In one example, the disclosure describes a method of processing a point cloud, the method comprising: determining that angular mode is enabled for encoding or decoding a current point of points in the point cloud; and parsing or signaling information for an azimuthal angle residual value for the current point independent of a radius value of the current point or a radius value of a previous point of the point cloud that is previous to the current point in decoding order, wherein the azimuthal angle residual value is based on a difference between an azimuthal angle value of the current point and a predictor azimuthal angle value of the current point, and wherein the azimuthal angle value of the current point is indicative an azimuthal angle of the current point based on a laser used to capture the points of the point cloud.

In one example, the disclosure describes a device for processing a point cloud, the device comprising: one or more memories configured to store the point cloud; and one or more processors implemented in circuitry and configured to: determine that angular mode is enabled for encoding or decoding a current point of points in the point cloud; and parse or signal information for an azimuthal angle residual value for the current point independent of a radius value of the current point or a radius value of a previous point of the point cloud that is previous to the current point in decoding order, wherein the azimuthal angle residual value is based on a difference between an azimuthal angle value of the current point and a predictor azimuthal angle value of the current point, and wherein the azimuthal angle value of the current point is indicative an azimuthal angle of the current point based on a laser used to capture the points of the point cloud.

In one example, the disclosure describes a computer-readable storage medium storing instructions thereon that when executed cause one or more processors to: determine that angular mode is enabled for encoding or decoding a current point of points in a point cloud; and parse or signal information for an azimuthal angle residual value for the current point independent of a radius value of the current point or a radius value of a previous point of the point cloud that is previous to the current point in decoding order, wherein the azimuthal angle residual value is based on a difference between an azimuthal angle value of the current point and a predictor azimuthal angle value of the current point, and wherein the azimuthal angle value of the current point is indicative an azimuthal angle of the current point based on a laser used to capture the points of the point cloud.

The details of one or more examples are set forth in the accompanying drawings and the description below. Other features, objects, and advantages will be apparent from the description, drawings, and claims.

DETAILED DESCRIPTION

Figure 1:
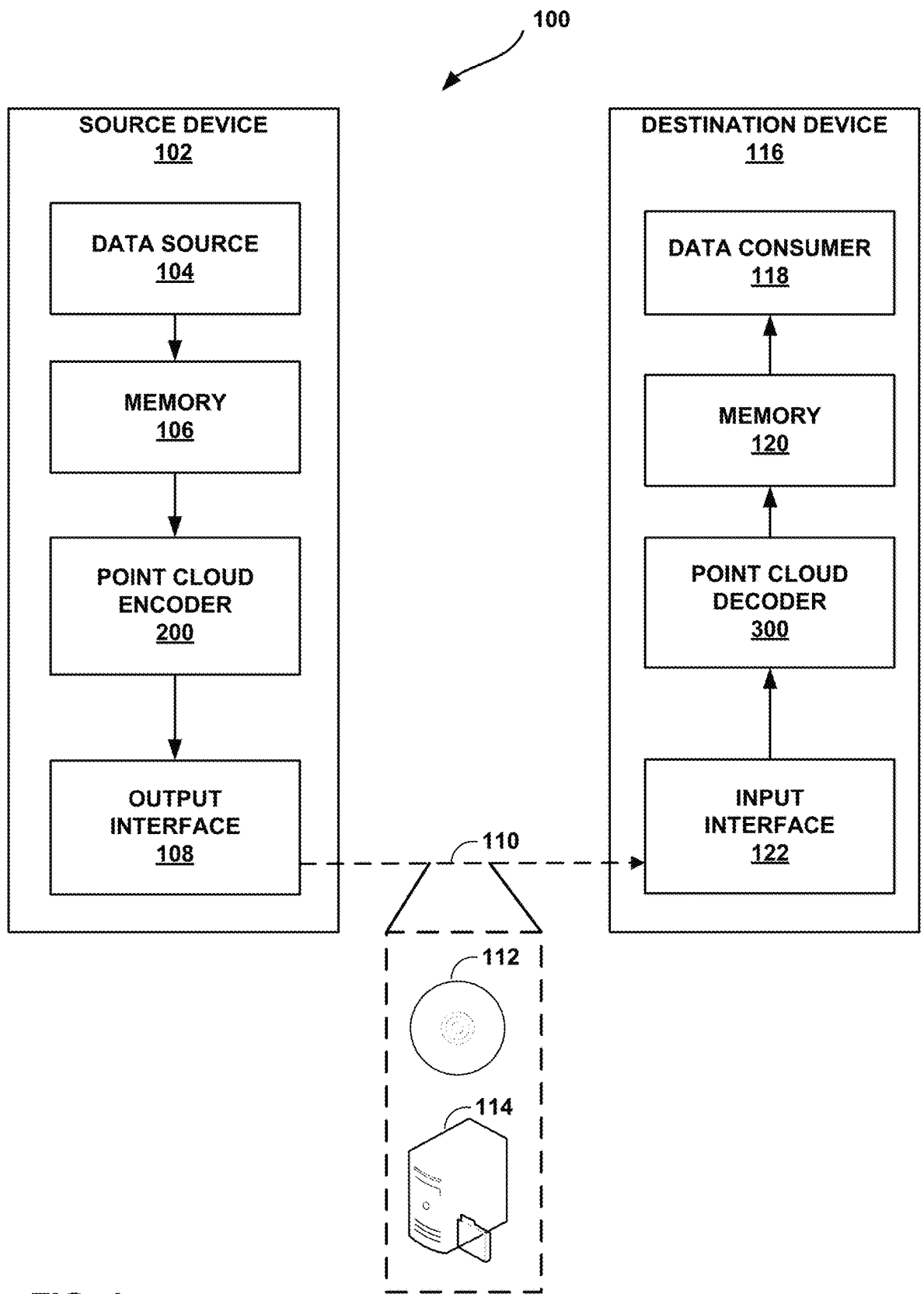
FIG. 1 is a block diagram illustrating an example encoding and decoding system that may perform the techniques of this disclosure.

In geometry point cloud compression (G-PCC), a point cloud encoder encodes values of points in a point cloud, and signals information that a point cloud decoder uses to decode (e.g., reconstruct) the values of the points. In this way, the point cloud decoder reconstructs the point cloud.

One example technique of encoding or decoding points in the point cloud is in angular mode. In angular mode, the coordinates of the points are represented with radius (r), azimuthal angle value ($\phi$), and laser index (i). The azimuthal angle value of the current point is indicative an azimuthal angle of the current point based on a LiDAR system used to capture the points of the point cloud (e.g., based on a laser of the LiDAR system). The radius is the distance from the laser of the LiDAR system and the current point.

In a rotating LiDAR system, one or more lasers may be rotating about an axis, with lasers emitting at certain intervals and the sensor captures the reflected lights which is then used to determine the distance of the points (corresponding to ground, objects, buildings, etc. in the scene) from the LiDAR system. Typical rotating LiDAR systems use a coordinate system relative to itself to indicate the coordinates of the points, with x-y axis horizontal to the ground in which the LiDAR system is placed, and z-axis point in the vertical direction. Thus, azimuthal angle indicates the angle with the x-axis in the x-y plane. However, other conventions may also be used as the techniques disclosed here are not restricted to any particular coordinate system or convention used.

Furthermore, the point cloud encoder and the point cloud decoder may utilize inter or intra-prediction, quantization, and entropy coding techniques to reduce the amount of information that the point cloud encoder signals and the point cloud decoder parses. For instance, as part of inter or intra-prediction, rather than signaling the actual value for that azimuthal angle, the point cloud encoder may signal information for an azimuthal angle residual value, where the azimuthal angle residual value is based on a difference between an azimuthal angle value of the current point and a predictor azimuthal angle value of the current point. One example of the predictor azimuthal angle is a previously decoded point that is near the azimuth position of the current point in a reference frame (e.g., previously decoded frame). Another example of the predictor azimuthal angle is the azimuthal angle of the previously decoded point in the current frame. The techniques described are not limited to any particular predictor, and apply irrespective of which predictor is used for azimuthal angle.

The point cloud encoder may signal, in a bitstream, and the point cloud decoder may parse, from the bitstream, information that the point cloud decoder uses to decode (e.g., reconstruct) the value of the azimuthal angle residual value. In this disclosure, the term "signal" or "parse" refer to the information that the point cloud encoder includes in the bitstream and that the point cloud decoder receives from the bitstream. The term "decode" or "reconstruct" refer to determining (e.g., generating) the actual values from the parsed information.

This disclosure describes example techniques of parsing or signaling information for an azimuthal angle residual value for a current point of a point cloud independent of a radius value of the current point or a radius value of a previous point of the point cloud that is previous to the current point in decoding order. In general, there may be benefits in separating and keeping distinct the operations of parsing information and the operations of determining (e.g., decoding or reconstructing) the actual values from the parsed information. This allows for parsing and reconstructing to be performed in parallel. That is, a point cloud decoder may be able to parse information for an azimuthal angle residual value of a current point in parallel with or at least independent from the determining (e.g., decoding or reconstructing) of values of a previous point.

However, some techniques required a point cloud decoder to determine whether certain information for the azimuthal angle residual value for the current point is to be parsed based on whether a condition based on the radius value of the current point or the radius value of a previous point is satisfied. Accordingly, in those techniques the parsing of information for the azimuthal angle residual value of the current point may be delayed until the determination of the radius value for the current point or the radius value of a previous point. With the example techniques described in this disclosure, the parsing or signaling information for an azimuthal angle residual value for the current point may be independent of a radius value of the current point or a radius value of a previous point of the point cloud that is previous to the current point in decoding order. This way, parsing of information for the azimuthal angel residual value for the current point may occur in parallel or at least may not be delayed by the determination of the radius value of the current point or the radius value of a previous point.

Furthermore, in those techniques in which parsing of the azimuthal angle residual value for the current point was dependent on the radius value of the current point or the radius value of the previous point, a quantization parameter for quantizing or de-quantizing the azimuthal angle residual value for the current point and one or more context values for encoding or decoding the azimuthal angle residual value for the current point were also dependent upon the radius value of the current point or the radius value of the previous point. With the example techniques described in this disclosure, the point cloud decoder may determine the quantization parameter and/or one or more context values for decoding the azimuthal angle residual value independent of the radius value of the current point or the radius value of the previous point of the point cloud.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a point cloud encoder 200 (e.g., G-PCC encoder or other types of encoder), and an output interface 108. Destination device 116 includes an input interface 122, a point cloud decoder (e.g., G-PCC decoder or other types of decoder), a memory 120, and a data consumer 118. In accordance with this disclosure, point cloud encoder 200 of source device 102 and point cloud decoder 300 of destination device 116 may be configured to apply the techniques of this disclosure related to predictive geometry coding for point cloud compression, such as parsing or signaling information for an azimuthal angle residual value for a current point independent of a radius value of the current point or a radius value of a previous point of the point cloud that is previous to the current point in decoding order. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to predictive geometry coding for point cloud compression, such as parsing or signaling information for an azimuthal angle residual value for the current point independent of a radius value of the current point or a radius value of a previous point of the point cloud that is previous to the current point in decoding order. Source device 102 and destination device 116 are merely examples of such devices in which source device 102 generates coded data for transmission to destination device 116. This disclosure refers to a "coding" device as a device that performs coding (encoding and/or decoding) of data. Thus, point cloud encoder 200 and point cloud decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to point cloud encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, point cloud encoder 200 encodes the captured, pre-captured, or computer-generated data. Point cloud encoder 200 may rearrange the frames from the received order (sometimes referred to as "display order") into a coding order for coding. Point cloud encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from point cloud decoder 300. Additionally or alternatively, memory 106 and memory 120 may store software instructions executable by, e.g., point cloud encoder 200 and point cloud decoder 300, respectively. Although memory 106 and memory 120 are shown separately from point cloud encoder 200 and point cloud decoder 300 in this example, it should be understood that point cloud encoder 200 and point cloud decoder 300 may also include internal memories for functionally similar or equivalent purposes. Furthermore, memory 106 and memory 120 may store encoded data, e.g., output from point cloud encoder 200 and input to point cloud decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to point cloud encoder 200 and/or output interface 108, and destination device 116 may include an SoC device to perform the functionality attributed to point cloud decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by point cloud encoder 200, which is also used by point cloud decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

Point cloud encoder 200 and point cloud decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of point cloud encoder 200 and point cloud decoder 300 may be included in one or more encoders or decoders, either of which may be integrated as part of a combined encoder/decoder (CODEC) in a respective device. A device including point cloud encoder 200 and/or point cloud decoder 300 may comprise one or more integrated circuits, microprocessors, and/or other types of devices.

Point cloud encoder 200 and point cloud decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, point cloud encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

This disclosure may generally refer to "parsing" certain information, such as syntax elements. The term "parsing" may generally refer to evaluating a received bitstream for syntax elements, including a determination of whether a particular syntax element or other information is included in the bitstream.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
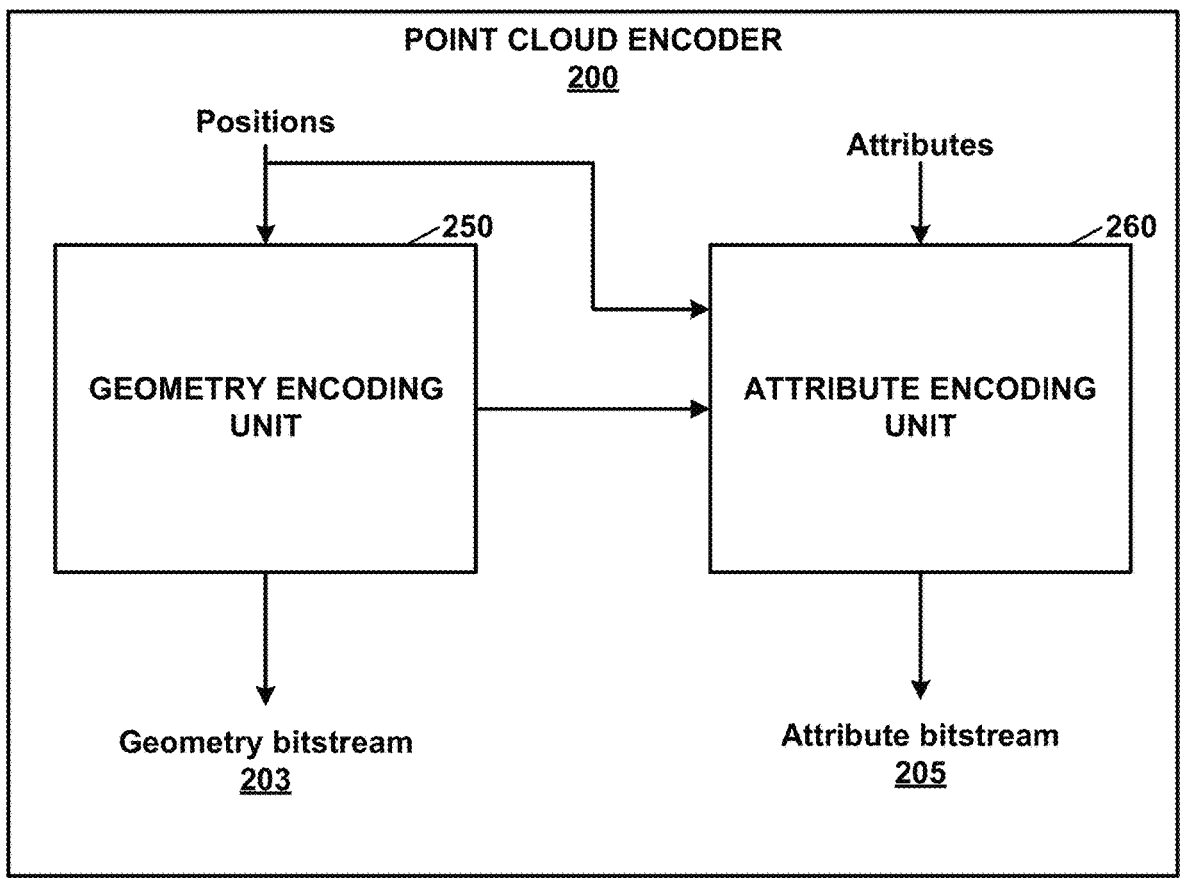
FIG. 2 is a block diagram illustrating an example Geometry Point Cloud Compression (G-PCC) encoder.
Figure 3:
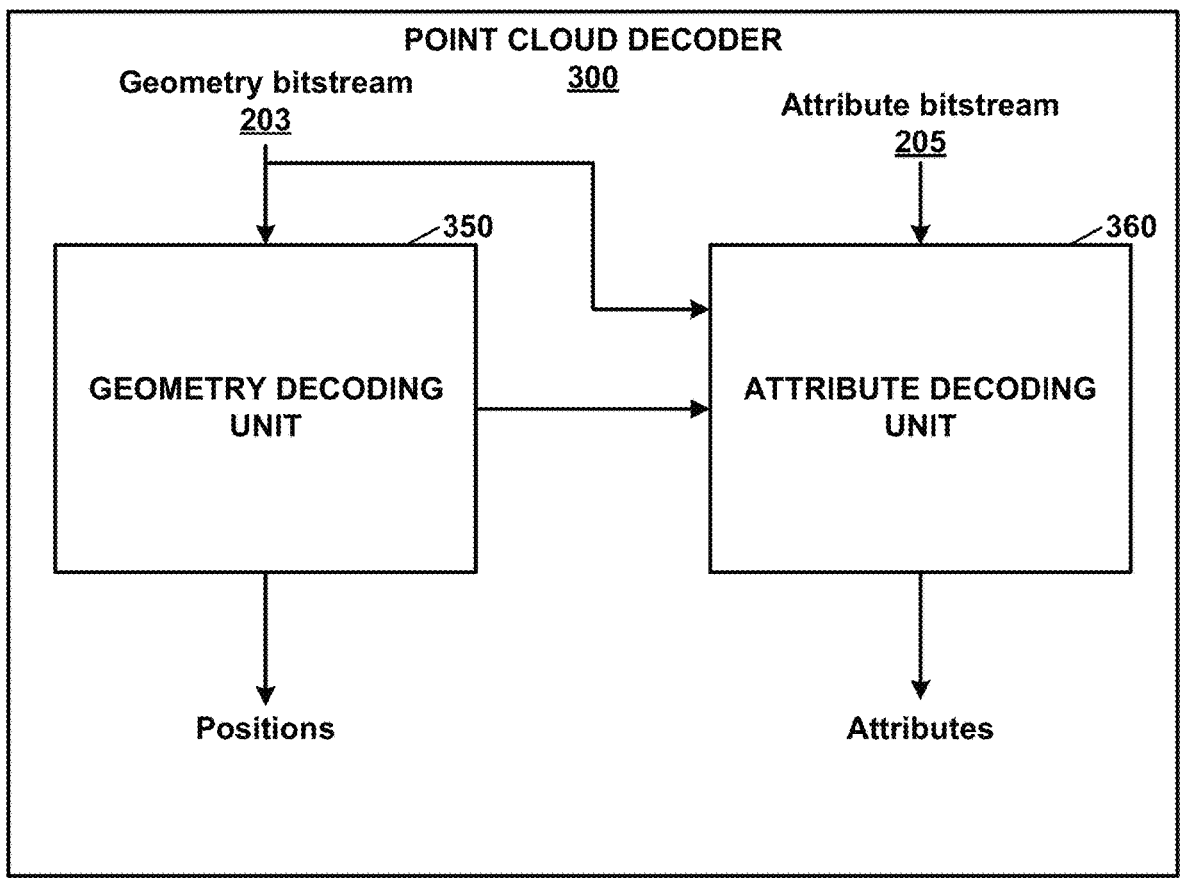
FIG. 3 is a block diagram illustrating an example G-PCC decoder.

FIG. 2 provides an overview of point cloud encoder 200. FIG. 3 provides an overview of point cloud decoder 300.

The modules shown are logical, and do not necessarily correspond one-to-one to implemented code in the reference implementation of G-PCC codec, i.e., TMC13 test model software studied by ISO/IEC MPEG (JTC 1/SC 29/WG 11). In the example of FIG. 2, point cloud encoder 200 may include a geometry encoding unit 250 and an attribute encoding unit 260. In general, geometry encoding unit 250 is configured to encode the positions of points in the point cloud frame to produce geometry bitstream 203. Attribute encoding unit 260 is configured to encode the attributes of the points of the point cloud frame to produce attribute bitstream 205. As will be explained below, attribute encoding unit 260 may also use the positions, as well as the encoded geometry from geometry encoding unit 250 to encode the attributes.

In the example of FIG. 3, point cloud decoder 300 may include a geometry decoding unit 350 and an attribute decoding unit 360. In general, geometry encoding unit 350 is configured to decode the geometry bitstream 203 to recover the positions of points in the point cloud frame. Attribute decoding unit 360 is configured to decode the attribute bitstream 205 to recover the attributes of the points of the point cloud frame. As will be explained below, attribute decoding unit 360 may also use the positions from the decoded geometry from geometry decoding unit 350 to decode the attributes.

In both point cloud encoder 200 and point cloud decoder 300, point cloud positions are coded first. Attribute coding depends on the decoded geometry. In FIGS. 4-7 of this disclosure, the coding units with vertical hashing are options typically used for Category 1 data. Diagonal-crosshatched coding units are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

Figure 8:
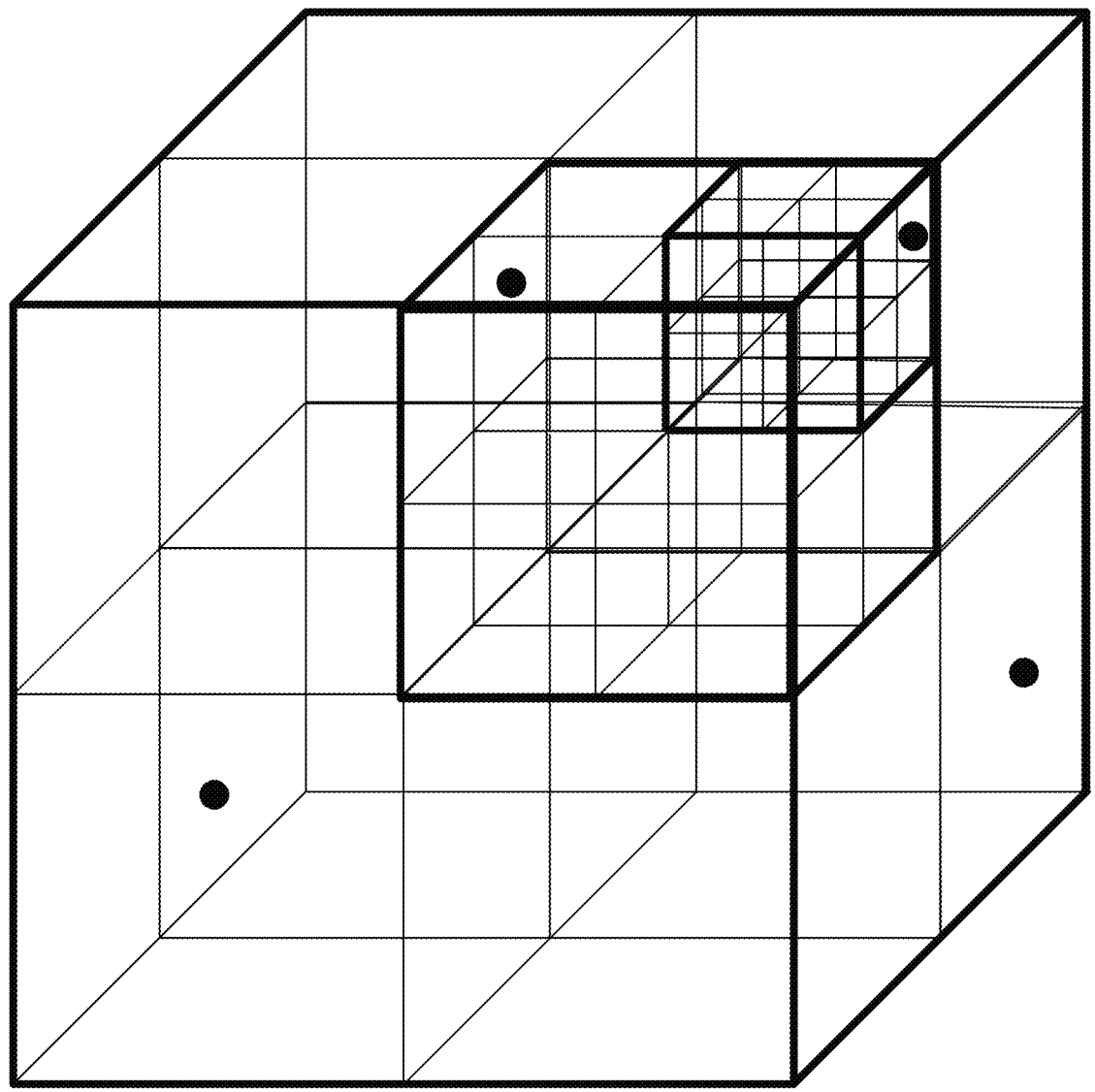
FIG. 8 is a conceptual diagram illustrating an example octree split for geometry coding.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded. FIG. 8 is a conceptual diagram illustrating an example octree split for geometry coding.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, like with the geometry codecs in G-PCC, the attribute coding method used to code the point cloud is specified in the bitstream.

The coding of the attributes may be conducted in a level-of-detail (LoD), where with each level of detail a finer representation of the point cloud attribute may be obtained. Each level of detail may be specified based on distance metric from the neighboring nodes or based on a sampling distance.

At point cloud encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

Point cloud encoder 200 and point cloud decoder 300 may be configured to code point cloud data using predictive geometry coding as an alternative to the octree geometry coding. In prediction tree coding, the nodes of the point cloud are arranged in a tree structure (which defines the prediction structure), and various prediction strategies are used to predict the coordinates of each node in the tree with respect to its predictors.

Figure 9:
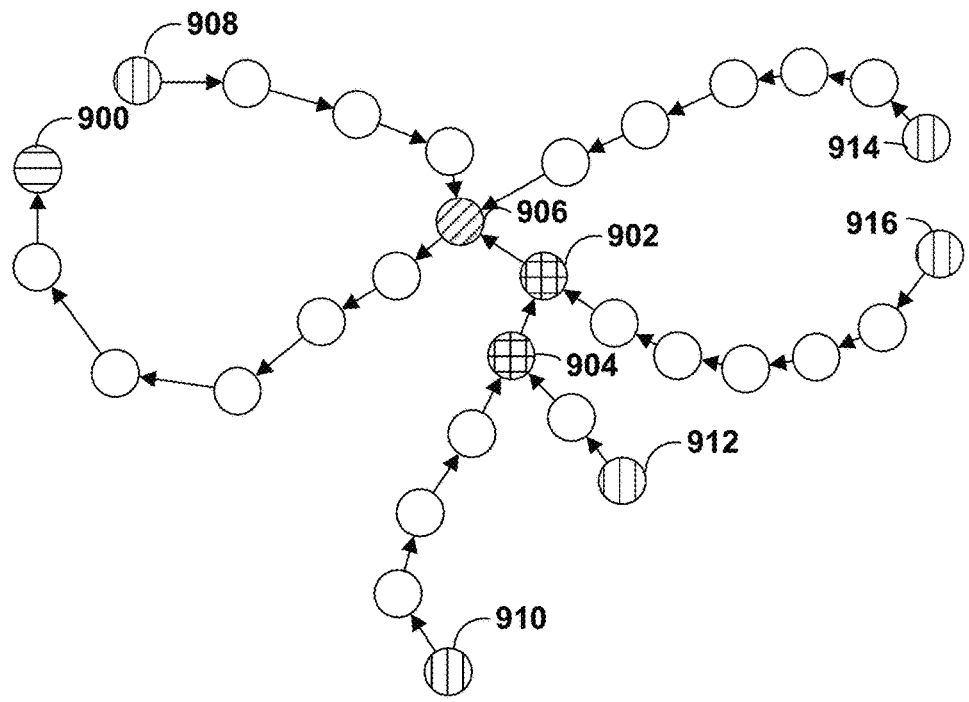
FIG. 9 is a conceptual diagram illustrating an example of a prediction tree.

FIG. 9 is a conceptual diagram illustrating an example of a prediction tree 900. In the example of FIG. 9, prediction tree 900 is shown as a directed graph where arrows point to the prediction direction. The horizontally lined node 900 is the root node and has no predictors. Double-lined nodes (e.g., nodes 902, 904) have two children; the diagonally lined node (e.g., node 906) has 3 children; the open nodes have one child and the vertically lined nodes (e.g., nodes 908, 910, 912, 914, and 916) are leaf nodes and these have no children. Every node aside from the root node has only one parent node.

Accordingly, a node that is the root vertex and has no predictors. Other nodes may have 1, 2, 3 or more children. Other nodes may be leaf nodes that have no children. In one example, every node of the predictive has only one parent node.

In one example, four prediction strategies are specified for each node based on its parent (p0), grand-parent (p1) and great-grand-parent (p2):

No prediction/zero prediction (0)
Delta prediction (p0)
Linear prediction (2*p0−p1)
Parallelogram prediction (p0+p1−p2)

Point cloud encoder 200 may employ any algorithm to generate the prediction tree; the algorithm used may be determined based on the application/use case and several strategies may be used. For each node, the residual coordinate values are coded in the bitstream starting from the root node in a depth-first manner. Predictive geometry coding may be particularly useful for Category 3 (LIDAR-acquired) point cloud data, e.g., for low-latency applications.

In some examples, angular mode may be used in predictive geometry coding, where the characteristics of LIDAR sensors may be utilized in coding the prediction tree more efficiently. The coordinates of the positions are converted to the (r, $\phi$, i) (radius, azimuth (also called azimuthal angle value) and laser index) and a prediction is performed in this domain (the residuals are coded in r, $\phi$, i domain). Due to the errors in rounding, coding in r, $\phi$, i is not lossless and hence a second set of residuals are coded which correspond to the Cartesian coordinates. A description of the encoding and decoding strategies used for angular mode for predictive geometry coding is provided below.

Figure 10A:
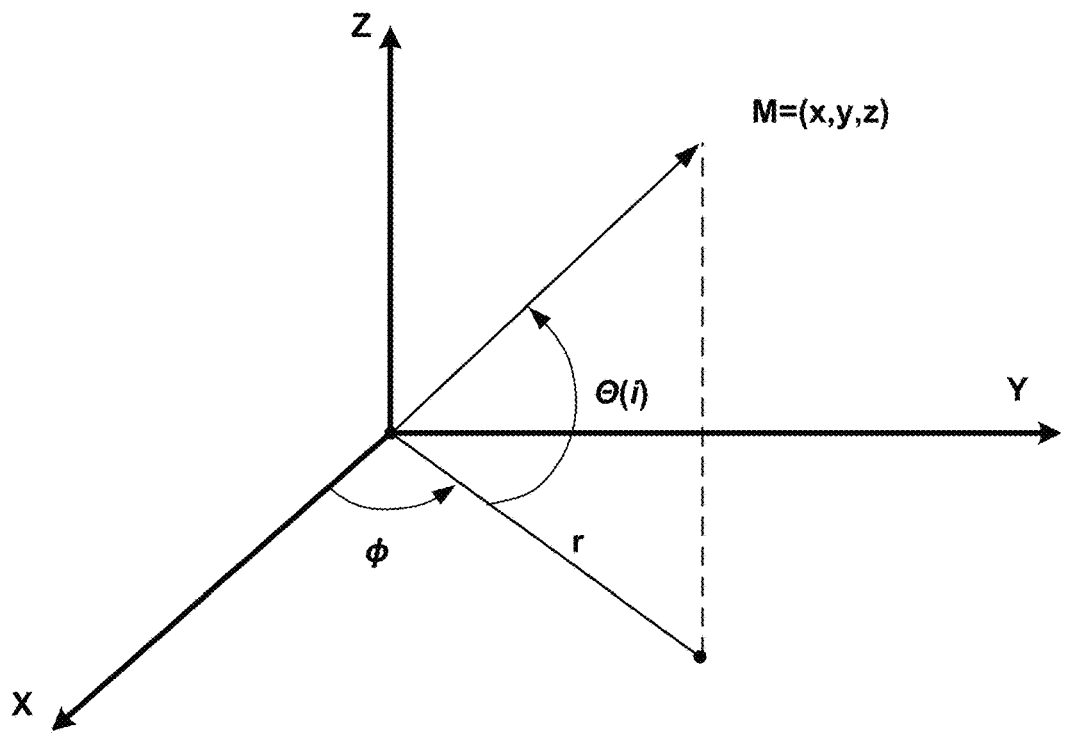
FIG. 10A and FIG. 10B are conceptual diagrams illustrating an example spinning LIDAR acquisition model.
Figure 10B:
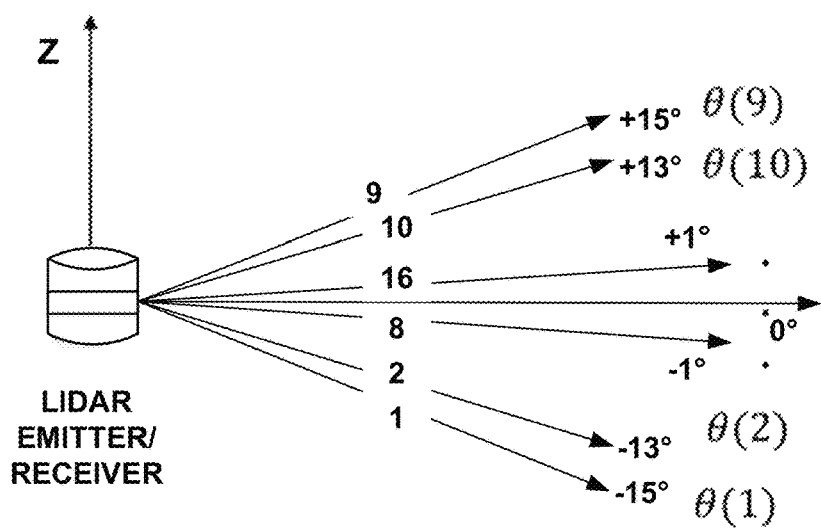

Angular mode for predictive geometry coding may be used with point clouds acquired using a spinning Lidar model. Here, the lidar has N lasers (e.g., N=16, 32, 64) spinning around the Z axis according to an azimuth angle $\phi$ (see FIGS. 10A and 10B). Each laser may have different elevation $\theta(i)_{i=1...N}$ and height $\zeta(i)_{i=1...N}$. In one example, laser i hits a point M, with cartesian integer coordinates (x, y, z), defined according to the coordinate system described in FIGS. 10A and 10B of an example spinning Lidar acquisition model.

Angular mode for predictive geometry coding may include modelling the position of M with three parameters (r, $\phi$, i), which are computed as follows:

$$r = \sqrt{x^2 + y^2}$$
$$\phi = \text{atan2}(y, x)$$
$$i = \arg \min_{j=1...N} \{z + \varsigma(j) - r \times \tan(\theta(j))\},$$

More precisely, angular mode for predictive geometry coding uses the quantized version of (r, $\phi$, i), denoted ($\tilde{r}$, $\tilde{\phi}$, i), where the three integers $\tilde{r}$, $\tilde{\phi}$ and i are computed as follows:

$$\tilde{r} = \text{floor}\left(\frac{\sqrt{x^2 + y^2}}{q_r} + o_r\right) = \text{hypot}(x, y)$$

$$\tilde{\phi} = \text{sign}(\text{atan2}(y, x)) \times \text{floor}\left(\frac{|\text{atan2}(y, x)|}{q_\phi} + o_\phi\right)$$

$$i = \arg \min_{j=1...N} \{z + \varsigma(j) - r \times \tan(\theta(j))\}$$

where ($q_r$, $o_r$) and ($q_\phi$, $o_\phi$) are quantization parameters controlling the precision of $\tilde{\phi}$ and $\tilde{r}$, respectively.

sign(t) is the function that return 1 if t is positive and (−1) otherwise.

|t| is the absolute value of t.

To avoid reconstruction mismatches due to the use of floating-point operations, the values of $\zeta(i)_{i=1...N}$ and $\tan(\theta(i))_{i=1...N}$ may be pre-computed and quantized as follows:

$$\tilde{z}(i) = \text{sign}(\varsigma(i)) \times \text{floor}\left(\frac{|\varsigma(i)|}{q_\varsigma} + o_\varsigma\right)$$

$$\tilde{t}(i) = \text{sign}\left(\varsigma(\tan(\theta(j))) \times \text{floor}\left(\frac{|\tan(\theta(j))|}{q_\theta} + o_\theta\right)\right)$$

where
($q_\zeta$, $o_\zeta$) and ($q_\theta$, $o_\theta$) are quantization parameters controlling the precision of g and $\tilde{\theta}$, respectively.

The reconstructed cartesian coordinates are obtained as follows:

$$\hat{x} = \text{round}(\tilde{r} \times q_r \times \text{app\_cos}(\tilde{\phi} \times q_\phi))$$

$$\hat{y} = \text{round}(\tilde{r} \times q_r \times \text{app\_sin}(\tilde{\phi} \times q_\phi))$$

$$\hat{z} = \text{round}(\tilde{r} \times q_r \times \tilde{t}(i) \times q_\theta - \tilde{z}(i) \times q_\zeta),$$

where app_cos(·) and app_sin(·) are approximation of cos(·) and sin(·). The calculations could be performed using a fixed-point representation, a look-up table, and linear interpolation.

Note that ($\hat{x}$, $\hat{y}$, $\hat{z}$) may be different from (x, y, z) due to various reasons:
- quantization
- approximations
- model imprecision
- model parameters imprecisions Let ($r_x$, $r_y$, $r_z$) be the reconstruction residuals defined as follows:

$$r_x = x - \hat{x}$$
$$r_y = y - \hat{y}$$
$$r_z = z - \hat{z}$$

In this method, point cloud encoder 200 may proceed as follows:
- Encode the model parameters $\hat{t}(i)$ and $\hat{z}(i)$ and the quantization parameters $q_r$, $q_\zeta$, $q_\theta$ and $q_\phi$
- Apply a geometry predictive scheme to the representation ($\tilde{r}$, $\tilde{\phi}$, i)
  - A new predictor leveraging the characteristics of Lidar could be introduced. For instance, the rotation speed of the lidar scanner around the z-axis is usually constant. Therefore, point cloud encoder 200 may predict the current $\tilde{\phi}(j)$ as follows:

$$\tilde{\phi}(j) = \tilde{\phi}(j-1) + n(j) \times \delta_\phi(k)$$

Where
- $(\delta_\phi(k))_{k=1 \ldots K}$ is a set of potential speeds the encoder could choose from. The index k could be explicitly written to the bitstream or could be inferred from the context based on a deterministic strategy applied by both point cloud encoder 200 and point cloud decoder 300, and
- n(j) is the number of skipped points which could be explicitly written to the bitstream or could be inferred from the context based on a deterministic strategy applied by both the encoder and the decoder. It is also referred to as "phi multiplier" later. Note, it is currently used only with delta predictor.
- Encode with each node the reconstruction residuals ($r_x$, $r_y$, $r_z$)

Point cloud decoder 300 may proceed as follows:
- Decode (e.g., reconstruct) the model parameters $\hat{t}(i)$ and $\hat{z}(i)$ and the quantization parameters $q_r$, $q_\zeta$, $q_\theta$ and $q_\phi$
- Decode the ($\tilde{r}$, $\tilde{\phi}$, i) parameters associated with the nodes according to the geometry predictive scheme used by point cloud encoder 200.
- Compute the reconstructed coordinates ($\hat{x}$, $\hat{y}$, $\hat{z}$) as described above.
- Decode the residuals ($r_x$, $r_y$, $r_z$)
  - As described in more detail, lossy compression could be supported by quantizing the reconstruction residuals ($r_x$, $r_y$, $r_z$)
- Compute the original coordinates (x, y, z) as follows $$x = r_x + \hat{x}$$
$$y = r_y + \hat{y}$$
$$z = r_z + \hat{z}$$

Lossy compression may be achieved by applying quantization to the reconstruction residuals ($r_x$, $r_y$, $r_z$) or by dropping points.

The quantized reconstruction residuals may be computed as follows:

$$\tilde{r}_x = \text{sign}(r_x) \times \text{floor}\left(\frac{|r_x|}{q_x} + o_x\right)$$

$$\tilde{r}_y = \text{sign}(r_y) \times \text{floor}\left(\frac{|r_y|}{q_y} + o_y\right)$$

$$\tilde{r}_z = \text{sign}(r_z) \times \text{floor}\left(\frac{|r_z|}{q_z} + o_z\right)$$

Where ($q_x$, $o_x$), ($q_y$, $o_y$) and ($q_z$, $o_z$) are quantization parameters controlling the precision of $\tilde{r}_x$, $\tilde{r}_y$, and $\tilde{r}_z$, respectively.

Trellis quantization may be used to further improve the RD (rate-distortion) performance results. The quantization parameters may change at sequence/frame/slice/block level to achieve region adaptive quality and for rate control purposes.

The attribute coding, octree geometry coding, and predictive tree geometry coding techniques may be performed as intra prediction coding techniques. That is, point cloud encoder 200 and point cloud decoder 300 may code attribute and position data using only information from the frame of point cloud data being coded. In other examples, point cloud encoder 200 and point cloud decoder 300 may code attributes, octree geometry, and/or predictive tree geometry using inter prediction techniques. That is, point cloud encoder 200 and point cloud decoder 300 may code attribute and position data using information from the frame of point cloud data being coded as well as information from previously-coded frames of point cloud data.

As described above, one example of predictive geometry coding uses a prediction tree structure to predict the positions of the points. When angular coding is enabled, the x, y, z coordinates are transformed to radius, azimuth (e.g., azimuthal angle value), and laserID and residuals are signaled in these three coordinates as well as in the x, y, z dimensions. The intra prediction used for radius, azimuth, and laserID may be one of four modes and the predictors are the nodes that are classified as parent, grand-parent and great-grandparent in the prediction tree with respect to the current node. In one example, predictive geometry coding may be configured as an intra coding tool as it only uses points in the same frame for prediction. However, using points from previously-decoded frames (e.g., inter-prediction) may provide a better prediction and thus better compression performance in some circumstances.

For predictive geometry coding using inter prediction, one technique involves predicting the radius of a point from a reference frame. For each point in the prediction tree, it is determined whether the point is inter predicted or intra predicted (indicated by a flag). When intra predicted, the intra prediction modes of predictive geometry coding are used. When inter-prediction is used, the azimuth and laserID are still predicted with intra prediction, while the radius is predicted from the point in the reference frame that has the same laserID as the current point and an azimuth that is closest to the current azimuth. Another example of this method enables inter prediction of the azimuth and laserID in addition to radius prediction. When inter-coding is applied, the radius, azimuth and laserID of the current point are predicted based on a point that is near the azimuth position of a previously decoded point in the reference frame. In addition, separate sets of contexts are used for inter and intra prediction.

Figure 11:
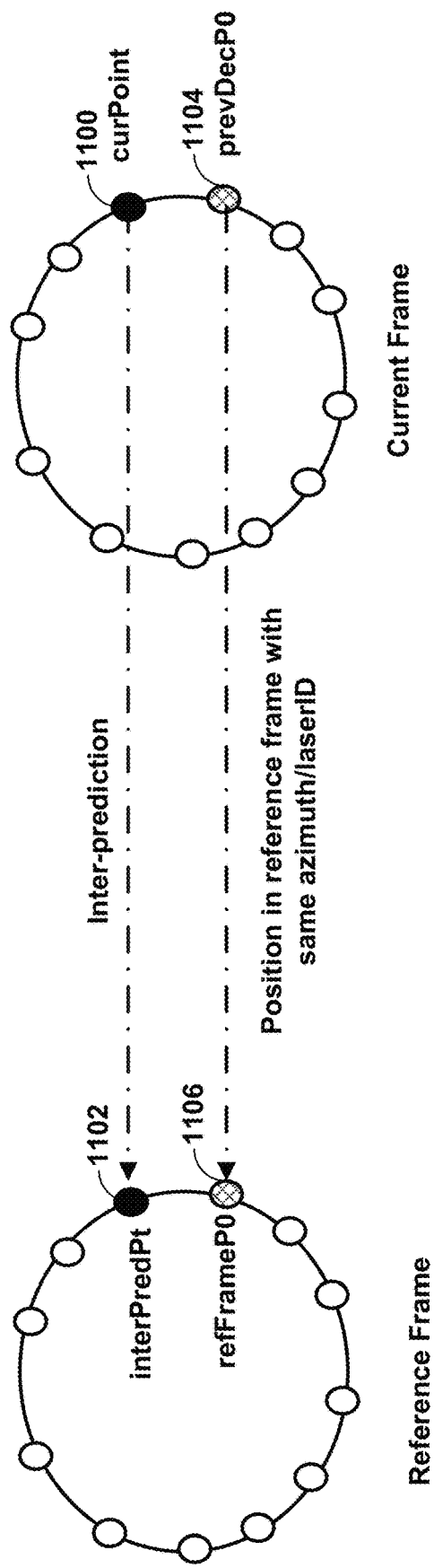
FIG. 11 is a conceptual diagram illustrating an example of inter-prediction of a current point (curPoint) from a point (interPredPt) in the reference frame.

A method is illustrated in FIG. 11. FIG. 11 is a conceptual diagram illustrating an example of inter-prediction of a current point (curPoint) 1100 in a current frame from a point (interPredPt) 1102 in the reference frame. The extension of inter prediction to azimuth, radius, and laserID may include the following steps:

For a given point, choose the previous decoded point (prevDecP0) 1104.

Choose a position point (refFrameP0) 1106 in the reference frame that has same scaled azimuth and laserID as prevDecP0 1104.

In the reference frame, find the first point (interPredPt) 1102 that has azimuth greater than that of refFrameP0 1106. The point interPredPt 1102 may also be referred to as the "Next" inter predictor.

Figure 4:
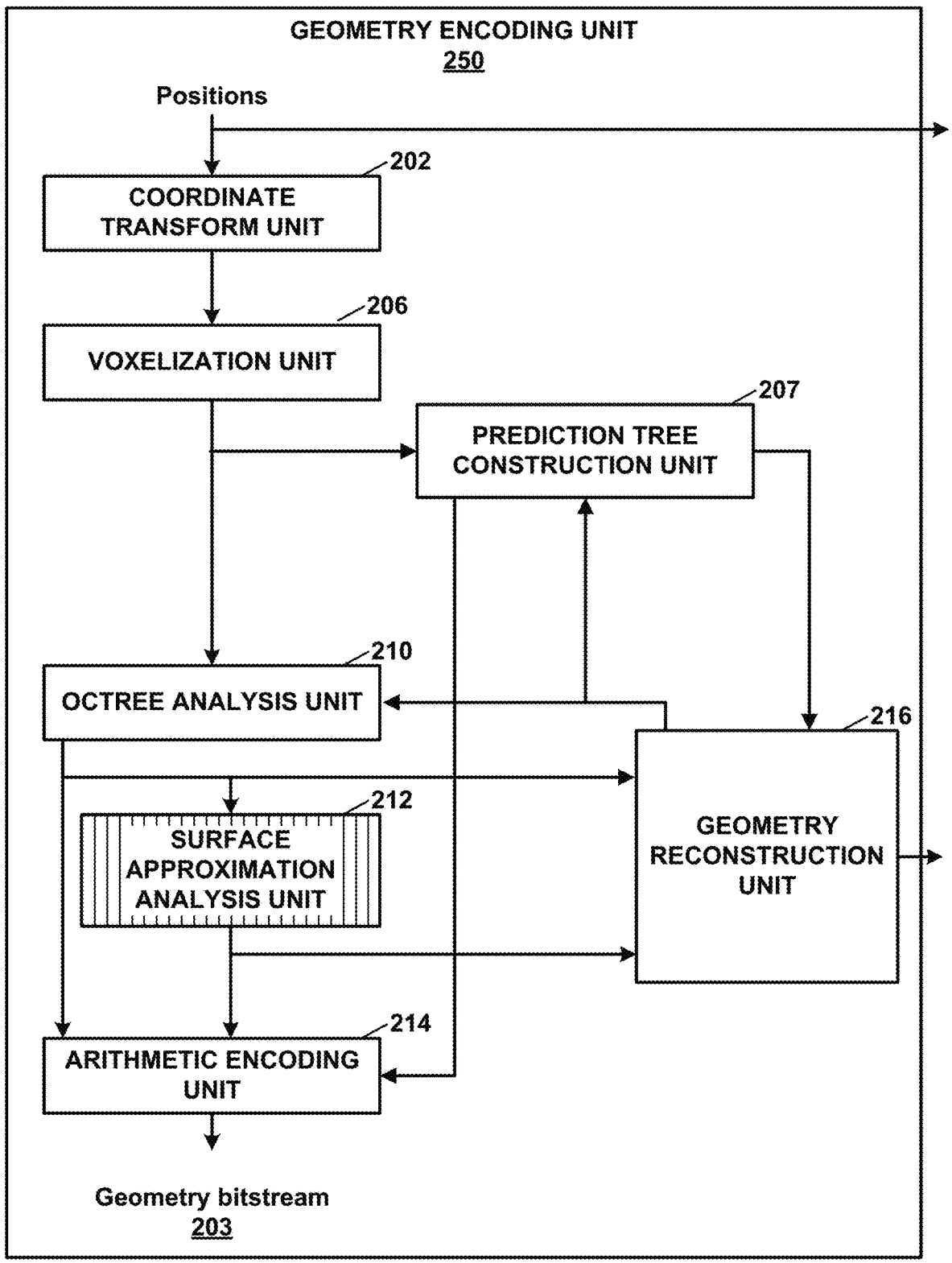
FIG. 4 is a block diagram illustrating an example geometry encoding unit of FIG. 2 in more detail.

FIG. 4 is a block diagram illustrating an example of geometry encoding unit 250 of FIG. 2 in more detail. Geometry encoding unit 250 may include a coordinate transform unit 202, a voxelization unit 206, a predictive tree construction unit 207, an octree analysis unit 210, a surface approximation analysis unit 212, an arithmetic encoding unit 214, and a geometry reconstruction unit 216.

As shown in the example of FIG. 4, geometry encoding unit 250 may obtain a set of positions of points in the point cloud. In one example, geometry encoding unit 250 may obtain the set of positions of the points in the point cloud and the set of attributes from data source 104 (FIG. 1). The positions may include coordinates of points in a point cloud. Geometry encoding unit 250 may generate a geometry bitstream 203 that includes an encoded representation of the positions of the points in the point cloud.

Coordinate transform unit 202 may apply a transform to the coordinates of the points to transform the coordinates from an initial domain to a transform domain. This disclosure may refer to the transformed coordinates as transform coordinates. Voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point.

Prediction tree construction unit 207 may be configured to generate a prediction tree based on the voxelized transform coordinates. Prediction tree construction unit 207 may be configured to perform any of the prediction tree coding techniques described above, either in an intra-prediction mode or an inter-prediction mode. In order to perform prediction tree coding using inter-prediction, prediction tree construction unit 207 may access points from previously-encoded frames from geometry reconstruction unit 216. Arithmetic encoding unit 214 may entropy encode syntax elements representing the encoded prediction tree.

Instead of performing prediction tree based coding, geometry encoding unit 250 may perform octree based coding. Octree analysis unit 210 may generate an octree based on the voxelized transform coordinates. Surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. Geometry encoding unit 250 may output these syntax elements in geometry bitstream 203. Geometry bitstream 203 may also include other syntax elements, including syntax elements that are not arithmetically encoded.

Octree-based coding may performed either as intra-prediction techniques or inter-prediction techniques. In order to perform octree tree coding using inter-prediction, octree analysis unit 210 and surface approximation analysis unit 212 may access points from previously-encoded frames from geometry reconstruction unit 216.

Geometry reconstruction unit 216 may reconstruct transform coordinates of points in the point cloud based on the octree, the predictive tree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points.

Figure 5:
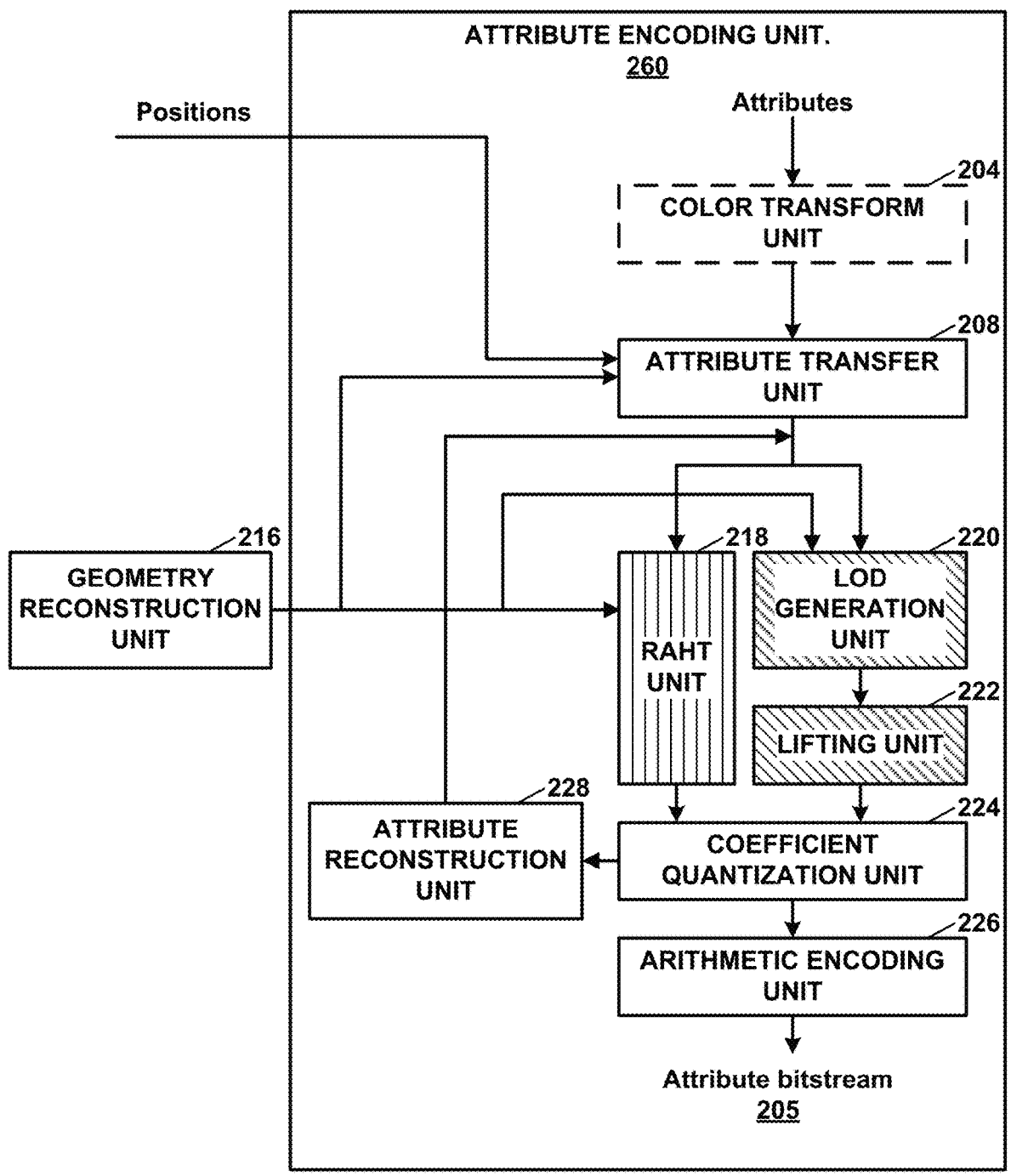
FIG. 5 is a block diagram illustrating an example attribute encoding unit of FIG. 2 in more detail.

FIG. 5 is a block diagram illustrating an example of attribute encoding unit 260 of FIG. 2 in more detail. Attribute encoding unit 250 may include a color transform unit 204, an attribute transfer unit 208, an RAHT unit 218, a LoD generation unit 220, a lifting unit 222, a coefficient quantization unit 224, an arithmetic encoding unit 226, and an attribute reconstruction unit 228. Attribute encoding unit 260 may encode the attributes of the points of a point cloud to generate an attribute bitstream 205 that includes an encoded representation of the set of attributes. The attributes may include information about the points in the point cloud, such as colors associated with points in the point cloud.

Color transform unit 204 may apply a transform to transform color information of the attributes to a different domain. For example, color transform unit 204 may transform color information from an RGB color space to a YcbCr color space. Attribute transfer unit 208 may transfer attributes of the original points of the point cloud to reconstructed points of the point cloud. Attribute transfer unit 208 may use the original positions of the points as well as the positions generated from attribute encoding unit 250 (e.g., from geometry reconstruction unit 216) to make the transfer.

RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LoD generation unit 220 and lifting unit 222 may apply LoD processing and lifting, respectively, to the attributes of the reconstructed points. LoD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LoD1 is obtained based on refinement level RL1, LoD2 is obtained based on RL1 and RL2, . . . LoDN is obtained by union of RL1, RL2, . . . RLN. In some cases, LoD generation may be followed by a prediction scheme (e.g., predicting transform) where attributes associated with each point in the LoD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. Point cloud encoder 200 may output these syntax elements in attribute bitstream 205. Attribute bitstream 205 may also include other syntax elements, including non-arithmetically encoded syntax elements.

Like geometry encoding unit 250, attribute encoding unit 260 may encode the attributes using either intra-prediction or inter-prediction techniques. The above description of attribute encoding unit 260 generally describes intra-prediction techniques. In other examples, RAHT unit 215, LoD generation unit 220, and/or lifting unit 222 may also use attributes from previously-encoded frames to further encode the attributes of the current frame. In this regard, attribute reconstructions unit 228 may be configured to reconstruct the encoded attributes and store them for possible future use in inter-prediction encoding.

Figure 6:
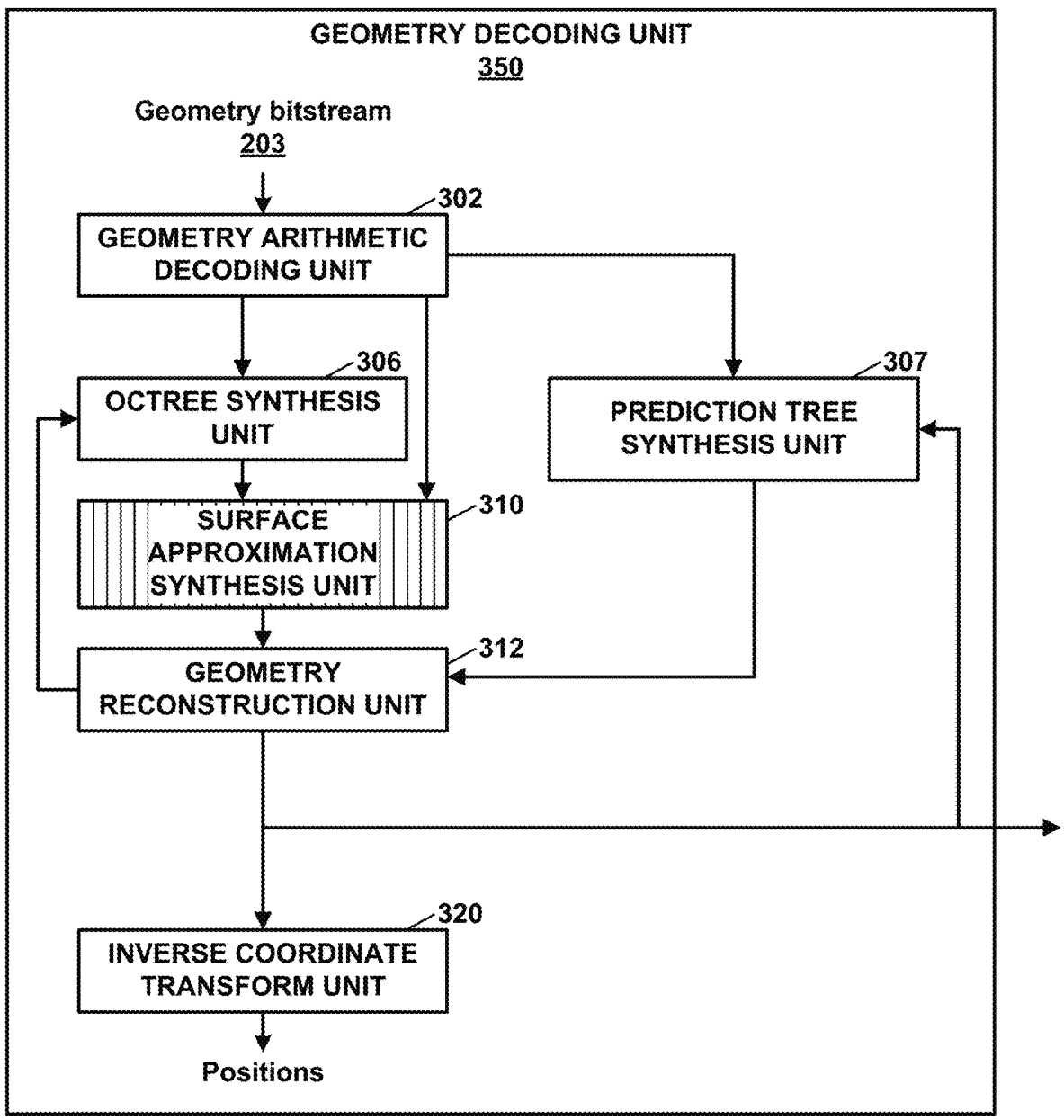
FIG. 6 is a block diagram illustrating an example geometry decoding unit of FIG. 3 in more detail.

FIG. 6 is a block diagram illustrating an example geometry decoding unit 350 of FIG. 3 in more detail. Geometry decoding unit 350 may be configured to perform the reciprocal process to that performed by geometry encoding unit 250 of FIG. 4. Geometry decoding unit 350 receives geometry bitstream 203 and produces positions of the points of a point cloud frame. Geometry decoding unit 350 may include a geometry arithmetic decoding unit 302, an octree synthesis unit 306, a prediction tree synthesis unit 307, a surface approximation synthesis unit 310, a geometry reconstruction unit 312, and an inverse coordinate transform unit 320.

Geometry decoding unit 350 may receive geometry bitstream 203. Geometry arithmetic decoding unit 302 may apply arithmetic decoding (e.g., Context-Adaptive Binary Arithmetic Coding (CABAC) or other type of arithmetic decoding) to syntax elements in geometry bitstream 203.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level.

At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Octree-based coding may be performed either as intra-prediction techniques or inter-prediction techniques. In order to perform octree tree coding using inter-prediction, octree synthesis unit 306 and surface approximation synthesis unit 310 may access points from previously-decoded frames from geometry reconstruction unit 312.

Prediction tree synthesis unit may synthesize a prediction tree based on syntax elements parsed from geometry bitstream 203. Prediction tree synthesis unit 307 may be configured to synthesize the prediction tree using any of the techniques described above, including using both intra-prediction techniques or intra-prediction techniques. In order to perform prediction tree coding using inter-prediction, prediction tree synthesis unit 307 may access points from previously-decoded frames from geometry reconstruction unit 312.

Geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Figure 7:
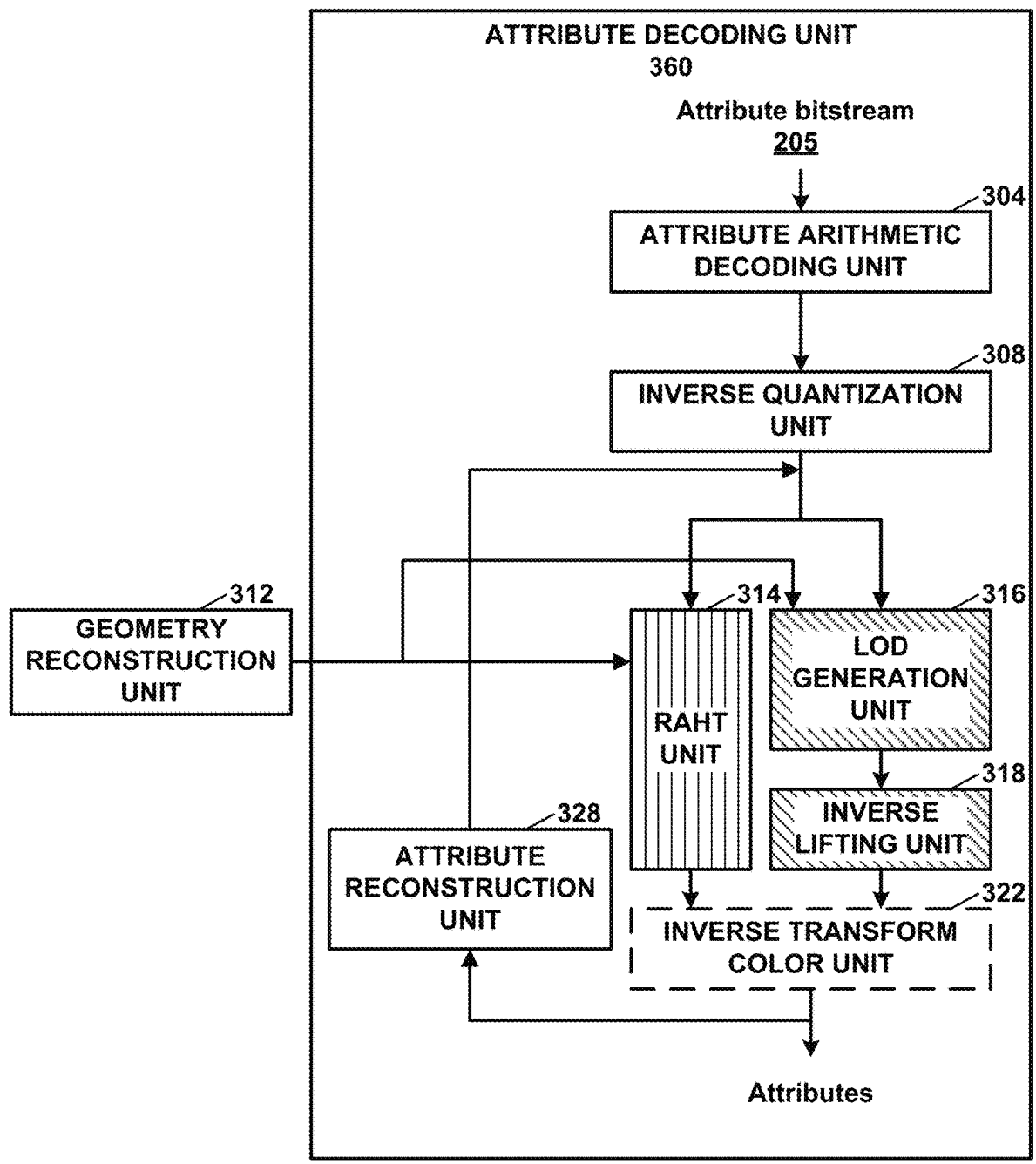
FIG. 7 is a block diagram illustrating an example attribute decoding unit of FIG. 3 in more detail.

FIG. 7 is a block diagram illustrating an example attribute decoding unit 360 of FIG. 3 in more detail. Attribute decoding unit 360 may be configured to perform the reciprocal process to that performed by attribute encoding unit 260 of FIG. 5. Attribute decoding unit 360 receives attribute bitstream 205 and produces attributes of the points of a point cloud frame. Attribute decoding unit 356 may include an attribute arithmetic decoding unit 304, an inverse quantization unit 308, a RAHT unit 314, an LoD generation unit 316, an inverse lifting unit 318, an inverse transform color unit 322, and an attribute reconstruction unit 328.

Attribute arithmetic decoding unit 304 may apply arithmetic decoding to syntax elements in attribute bitstream 205. Inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at point cloud encoder 200. Alternatively, LoD generation unit 316 and inverse lifting unit 318 may determine color values for points of the point cloud using a level of detail-based technique. LoD generation unit 316 decodes each LoD giving progressively finer representations of the attribute of points. With a predicting transform, LoD generation unit 316 derives the prediction of the point from a weighted sum of points that are in prior LoDs, or previously reconstructed in the same LoD. LoD generation unit 316 may add the prediction to the residual (which is obtained after inverse quantization) to obtain the reconstructed value of the attribute. When the lifting scheme is used, LoD generation unit 316 may also include an update operator to update the coefficients used to derive the attribute values. LoD generation unit 316 may also apply an inverse adaptive quantization in this case.

Furthermore, in the example of FIG. 7, inverse transform color unit 322 may apply an inverse color transform to the color values. The inverse color transform may be an inverse of a color transform applied by color transform unit 204 of encoder 200. For example, color transform unit 204 may transform color information from an RGB color space to a YcbCr color space. Accordingly, inverse color transform unit 322 may transform color information from the YcbCr color space to the RGB color space.

Attribute reconstruction unit 328 may be configured to store attributes from previously-decoded frames. Attribute coding may performed either as intra-prediction techniques or inter-prediction techniques. In order to perform attribute decoding using inter-prediction, RAHT unit 314 and/or LoD generation unit 316 may access attributes from previously-decoded frames from attribute reconstruction unit 328.

The various units of FIGS. 4-7 are illustrated to assist with understanding the operations performed by point cloud encoder 200 and point cloud decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 12:
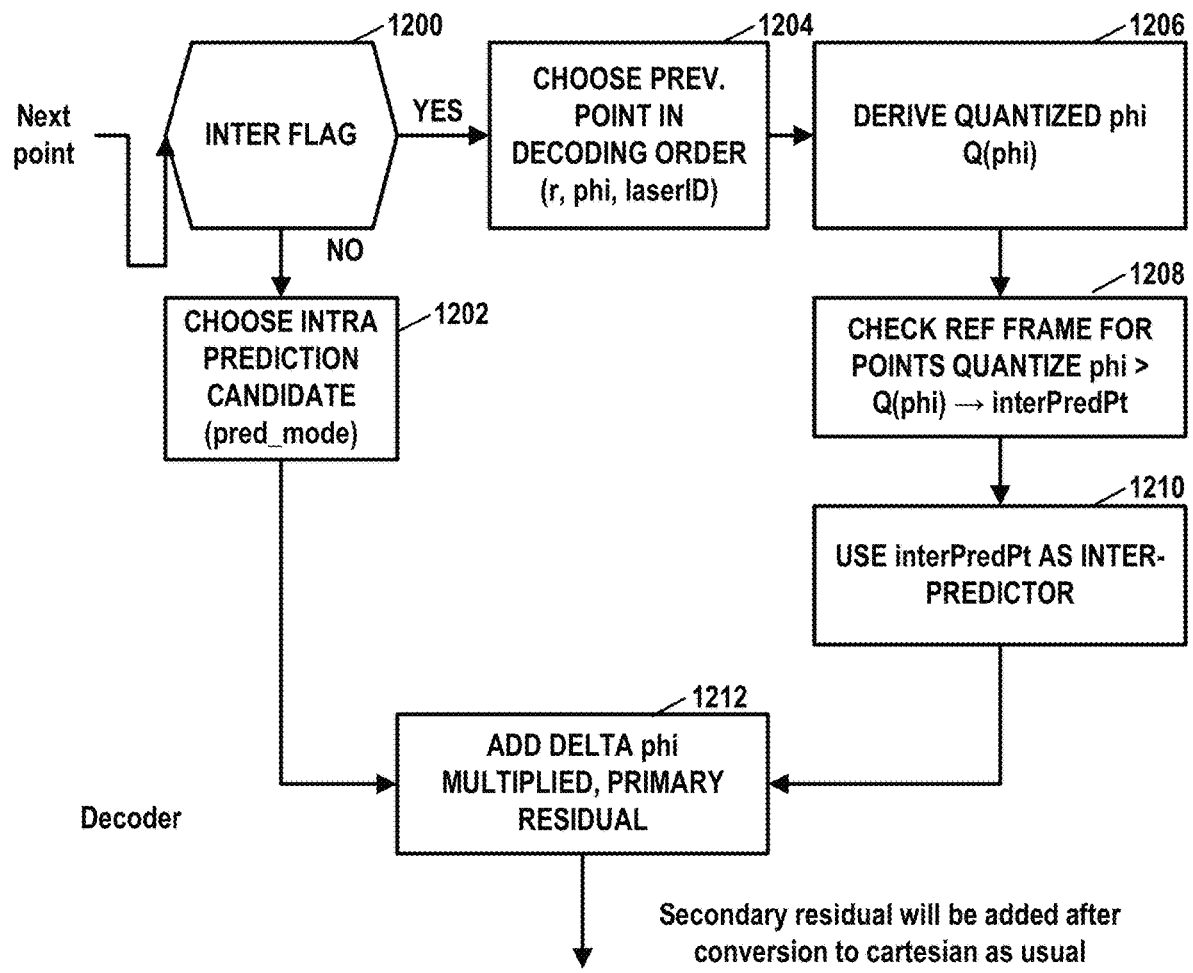
FIG. 12 is an example decoder flowchart.

FIG. 12 is a flowchart illustrating an example decoding flow associated with the "inter flag" that is signaled for every point. The inter flag signaled for a point indicates whether inter prediction is applied for the point. The flowcharts of this disclosure are provided as examples. Other examples may include more, fewer, or different steps, or steps may be performed in different orders.

In the example of FIG. 12, point cloud decoder 300 may determine whether an inter flag of a next point to be decoded (i.e., a current point of a current frame of point cloud data) indicates that the current point is inter predicted (1200). If the inter flag of the current point does not indicate that the current point is inter predicted ("NO" branch of 1200), point cloud decoder 300 may identify an intra prediction candidate (1202). For instance, point cloud decoder 300 may determine an intra prediction strategy (e.g., no prediction, delta prediction, linear prediction, parallelogram prediction, etc.) to determine a predictor for the current point. A syntax element (pred_mode) signaled in geometry bitstream 203 may indicate the intra prediction strategy to use to determine the predictor for the current point.

On the other hand, if the inter flag for the current point indicates that the current point is inter predicted ("YES" branch of 1200), point cloud decoder 300 may identify a previous point in decoding order (e.g., previous point) (1204). The previous point may have coordinates (r, phi (i.e., azimuthal angle value), and laserID). point cloud decoder 300 may then derive a quantized phi coordinate (i.e., azimuth coordinate) of the previous point (1206). The quantized phi coordinate may be denoted as Q(phi) or qphi. Point cloud decoder 300 may then check a reference frame (e.g., reference frame) for points (i.e., inter prediction points (e.g., interPredPt) having quantized phi coordinates greater than the quantized phi coordinate of the previous point (1208). point cloud decoder 300 may use the inter prediction point as a predictor for the current point (1210).

Regardless of whether point cloud decoder 300 determines the predictor for the current point using intra prediction (e.g., as described with respect to step 1202) or using inter prediction (e.g., as described with respect to steps 1204-1210), point cloud decoder 300 may add a delta phi multiplier (1212).

In the inter prediction method for predictive geometry described above, the radius, azimuth, and laserID of the current point are predicted based on a point that is near the collocated azimuth position in the reference frame when inter coding is applied using the following steps: for a given point, choose the previous decode point, choose a position in the reference frame that has the same scaled azimuth and laserID as the given point, and choose a position in the reference frame from the first point that has azimuth greater than the position in in the reference frame, to be used as the inter predictor point.

Figure 13:
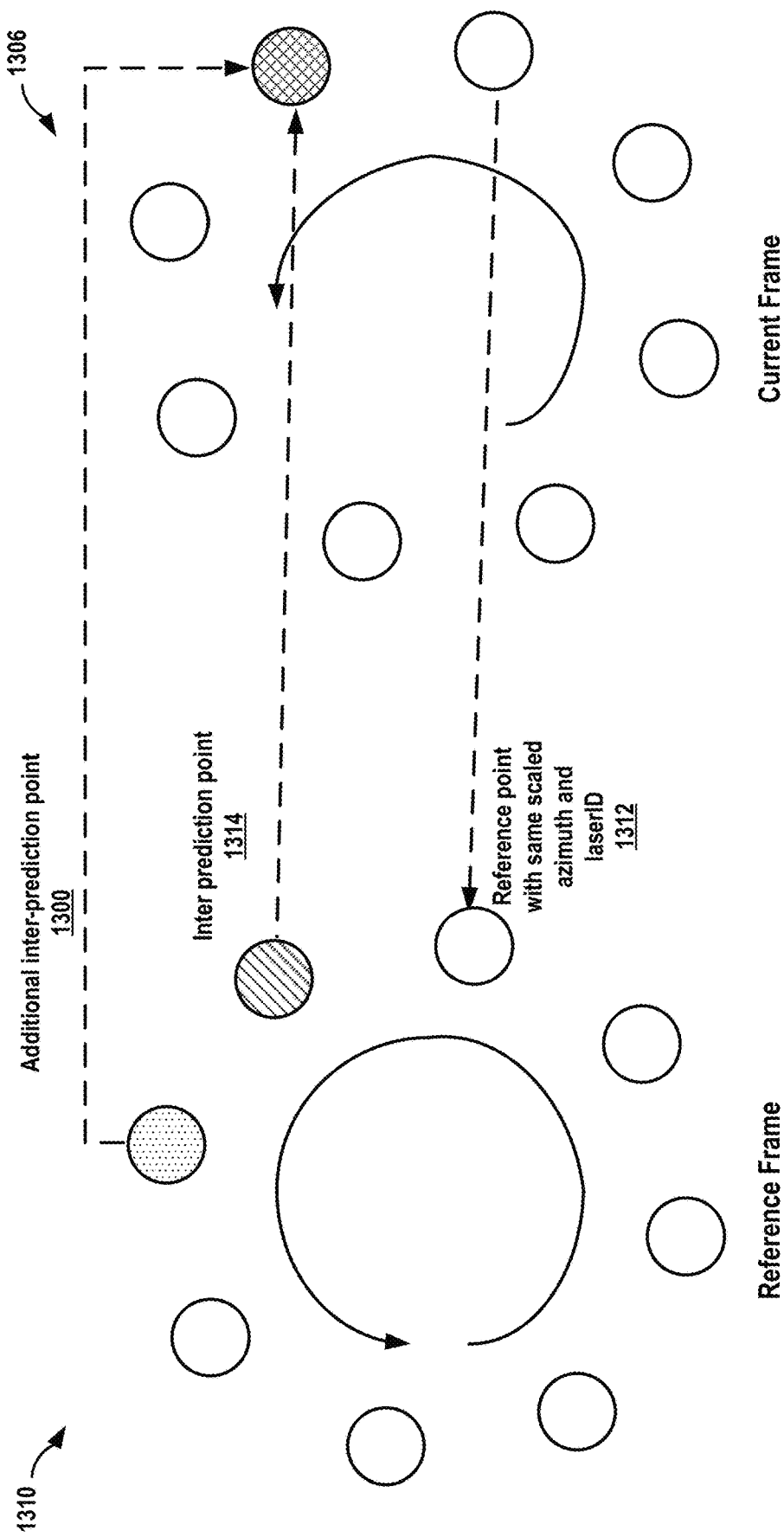
FIG. 13 is a conceptual diagram illustrating an example of an additional inter predictor point obtained from the first point that has azimuth greater than the inter predictor point.

FIG. 13 is a conceptual diagram illustrating an example additional inter predictor point 1300 obtained from the first point that has azimuth greater than an inter predictor point 1314. In the inter prediction method for predictive geometry described above with respect to FIGS. 11 and 12, the radius, azimuth, and laserID of a current point (current point 1100) are predicted based on a point (inter prediction point 1104) that is near the collocated azimuth position (reference position 1110) in a reference frame (reference frame 1106) when inter coding is applied. In the example of FIG. 13, point cloud encoder 200 and point cloud decoder 300 may determine additional inter predictor point 1300 using the following steps:

a. for a given point (current point 1304 of a current frame 1306), determine a previous point 1308 in current frame 1306 ("prev decoded point" in FIG. 13);

b. determine a reference position 1312 in a reference frame 1310 that has the same scaled azimuth and laserID as the previous point 1308 determined in step a) ("ref point with same scaled azimuth and laserID" in FIG. 13), c. determine a position in reference frame 1310 as the first point that has an azimuth (e.g., scaled azimuth) greater than the reference position 1312 determined in step b), to be used as the inter predictor point (inter prediction point 1314 in FIG. 13).

An additional inter predictor point may be obtained by finding the first point that has an azimuth (e.g., scaled azimuth) greater than inter prediction point 1314 determined in step c) as shown in FIG. 13 ("additional inter prediction point 1300" in FIG. 13). Additional signaling may be used to indicate which of the predictors is selected if inter coding has been applied. The additional inter predictor point may also be referred to as the "NextNext" inter predictor.

A context selection algorithm may be applied for coding the inter prediction flag. For example, the inter prediction flag values of the five previously coded points may be used to select the context of the inter prediction flag in predictive geometry coding.

Figure 14:
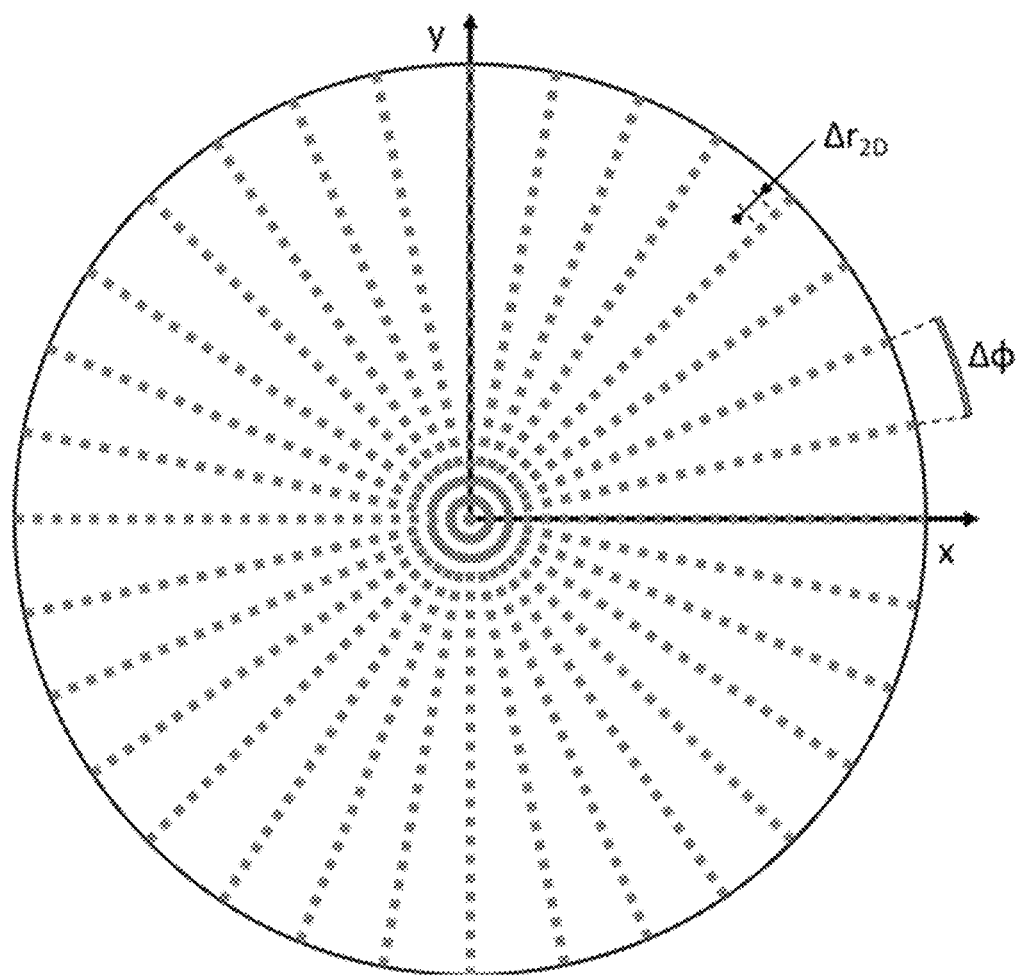
FIG. 14 is a conceptual diagram illustrating sampling of azimuthal angles and radius using uniform quantization, as in G-PCC Ed. 1.

Adaptive azimuthal angle quantization is now discussed. When using spherical coordinates in predictive geometry coding of LIDAR acquired point clouds in G-PCC Ed. 1, azimuthal angles are quantized regardless of the distance between the points and the LIDAR acquisition head. The sampling result of this quantization is roughly as illustrated in FIG. 14. FIG. 14 is a conceptual diagram illustrating sampling of azimuthal angles and radius using uniform quantization, as in G-PCC Ed. 1. FIG. 14 shows that the sampling density is high close to the origin, where a spinning sensors head is located, and becomes low in regions far from the spinning sensors head. Depending on the value $\Delta\phi$, one gets either too much precision for points $(r_1, \phi_1)$ close to the spinning sensor head or not enough precision for points $(r_2, \phi_2)$ far away from the sensor head. In the first case, for close points there is too much coded information for the residual error of azimuthal angle prediction. On the other hand, in the second case, there is not enough information coded for the residual error of azimuthal angle prediction of faraway points to have accurate precision on inverse transformed (x, y) values, thus leading to higher magnitude residual error in cartesian coordinates $(x_{res}, y_{res})$ to be coded. In both cases, the compression of the azimuthal angle $\phi$ is not optimal. In summary, the uniform quantization of $\phi$ does not lead to optimal representation of the point positions when considering the overall compression scheme of points in cartesian space.

Some techniques may adaptively quantize the azimuthal angle according to the radius, resulting in improved compression performance. To compress more efficiently, it is proposed to use an adaptive quantization step of the azimuthal angle $\phi$. Using the value of the reconstructed radius $r_{2D}$, the proposed non-uniform adaptive angular quantization step is changed to:

$$\Delta\phi(r_{2D}) = \Delta\phi_{arc}/r_{2D}. \tag{1}$$

By using this non-uniform quantization step, the length of the arc resulting of the $\Delta\phi(\cdot)$ quantization step is uniform for any radius $r_1$, $r_2$ as this length is equal to $r_1 \cdot \Delta\phi(r_1) = \Delta\phi_{arc} = r_2 \cdot \Delta\phi(r_2)$.

Figure 15:
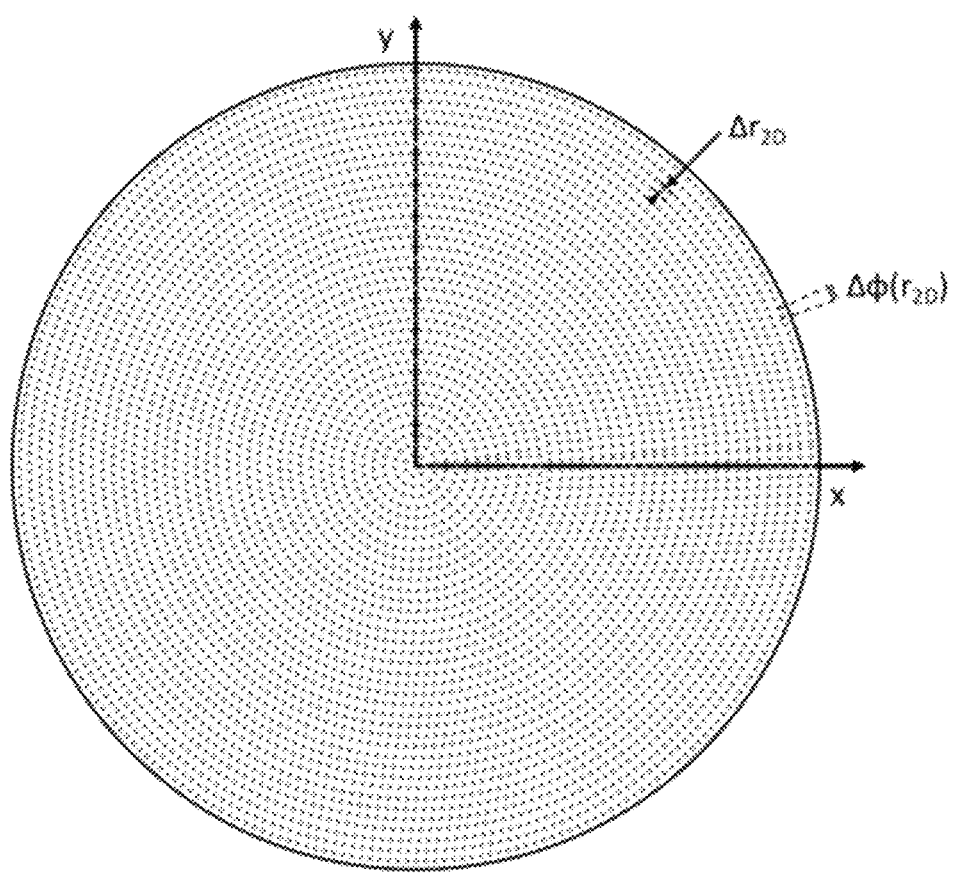
FIG. 15 is a conceptual diagram illustrating non-uniform quantization of the azimuthal angles, leading to uniform quantization arcs.
Figure 16:
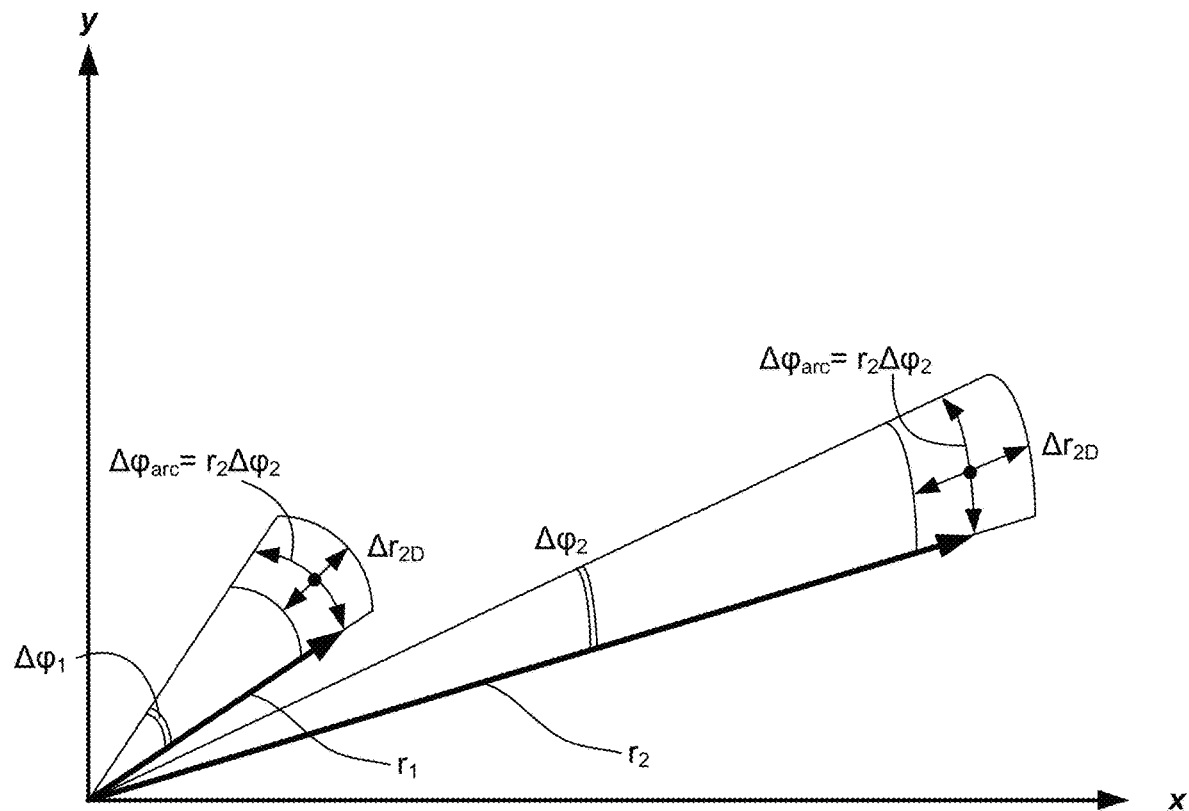
FIG. 16 is a conceptual diagram illustrating uniform quantization of circular arcs using $\Delta\phi_{arc}$ quantization step.

This non-uniform quantization step in $\phi$ domain may therefore provide a uniform quantization of circular arcs, with quantization step $\Delta\phi_{arc}$ for any radius as is illustrated in FIG. 15 and FIG. 16. FIG. 16 also shows the more uniform angular sectors implied by uniform quantization of the circular arcs, leading to more uniform maximum error introduced by the quantization of $\phi$. FIG. 15 is a conceptual diagram illustrating non-uniform quantization of the azimuthal angles, leading to uniform quantization arcs. FIG. 16 is a conceptual diagram illustrating uniform quantization of circular arcs using $\Delta\phi_{arc}$ quantization step.

Implementation details are described in J. Taquet, S. Lasserre, S. Gao, M.-L. Champel, [G-PCC][New] Improved Quantization of Azimuthal Angle in Predictive Geometry Coding, ISO/IEC JTC1/SC29/WG7 m55979, January 2021, with some additional modifications in J. Taquet, S. Lasserre, S. Gao, M.-L. Champel, [G-PCC][EE13.51] Report on Predictive Geometry Improvement, ISO/IEC JTC1/SC29/WG7 m56482, April 2021. The integer division in inverse quantization of the azimuthal residual is approximated by using the Newton-Raphson division approximation algorithm. In addition, the internal precision for representing azimuthal angles is increased (e.g., 24-bit for lossless), which led to a modification of the implementation of integer sine and cosine functions to keep 32-bit arithmetic, but the modification does not affect the normative definition of these functions. It also led to adapting the scaling of spherical coordinates for attribute coding due to the increased precision.

The improved quantization of azimuthal angle has been made backward compatible with G-PCC Ed. 1 by adding a flag in the geometry parameter set extension to enable/disable the feature.

Coding of the azimuth angle residual is now discussed. The following process to improve the coding of the azimuthal angle residual may be implemented in addition to the adaptive azimuthal angle quantization that is described above. When using spherical coordinates in predictive geometry coding of LIDAR-acquired point clouds in G-PCC Ed.1, the prediction of the azimuthal angle of a point can be refined by adding a number 'k' (coded in bitstream) of azimuthal steps '$\varphi_{step}$' to the azimuthal angle prediction '$\varphi \cdot n$' provided by the 'n'-th predictor:

$$\varphi_{pred} = k * \varphi_{step} + \varphi_{-n}. \tag{2}$$

The azimuthal step '$\varphi_{step}$' may basically correspond to the rotation performed by the LIDAR sensor head between two successive attempts for the acquisitions of points with a laser at a given elevation angle. It corresponds to the azimuthal angle provided by:

$$\varphi_{step} = \text{geom\_angular\_azimuth\_speed\_minus1} + 1 \tag{3}$$

where 'geom_angular_azimuth_speed_minus1' is obtained from the geometry parameter set (GPS).

In G-PCC Ed. 1, there is no constraint on the value of 'k'. Thus, the residual '$\varphi_{res}$' of the prediction of the azimuthal angle '$\varphi$' by predictor '$\varphi_{pred}$':

$$\varphi_{res} = \varphi - \varphi_{pred} \quad (4)$$

is unbounded.

In order to bound the residual '$\varphi_{res}$' such that it fits in the interval $[-\varphi_{step}/2; +\varphi_{step}/2]$, the value of 'k' may be determined as follows:

$$k = \text{round}((\varphi - \varphi_{-n})/\varphi_{step}) \quad (5)$$

More precisely, in the context of the adaptive quantization of azimuthal angle described above, the quantized azimuthal angle residual '$Q\varphi_{res}$' will satisfy the following equation:

$$-Q_\varphi(\varphi_{step}/2, r) = Q_\varphi(-\varphi_{step}/2, r) \le Q\varphi_{res} = Q_\varphi(\varphi_{res}, r) \le Q_\varphi(\varphi_{step}/2, r) \quad (6)$$

where '$Q_\varphi(x, r)$' is the adaptive quantization of 'x' based on the coded radius 'r'.

Then, by using the value of the bound '$B = Q_\varphi(\varphi_{step}/2, r)$', the entropy coding of the quantized residual '$Q\varphi_{res}$' may be improved.

First, bound '$B = Q_\varphi(\varphi_{step}/2, r)$' is computed for each point as follows:

```
const int rec_radius_scaling = rPred + residual[0]<<3; //~r*2*pi
auto speed_r = int64_t(_geomAngularAzimuthSpeed)*rec_radius_scaling;
int phiBound =
divExp2RoundHalfInf(speed_r, _geom_angular_azimuth_scale_log2 + 1);
```

Figure 17:
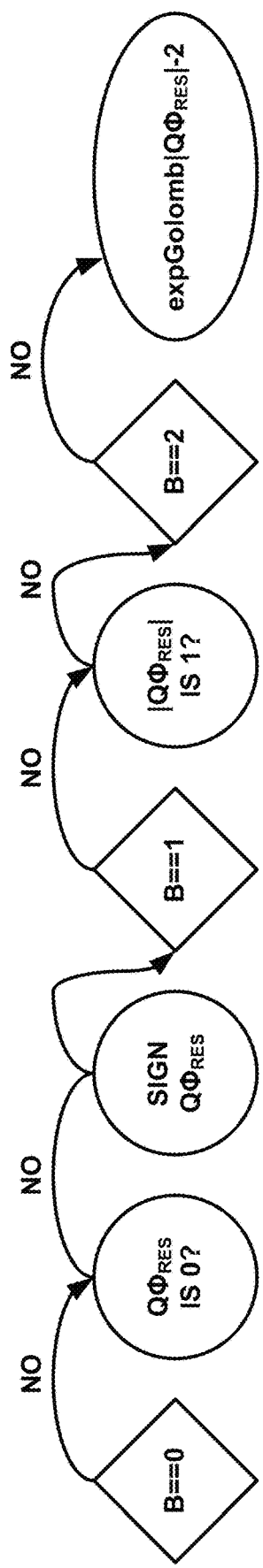
FIG. 17 is a conceptual diagram illustrating an example of entropy encoding of quantized residual azimuthal angle using bound B.

Then, encoder 200 may perform entropy encoding as illustrated in FIG. 17. FIG. 17 is a conceptual diagram illustrating an example of entropy encoding of quantized residual azimuthal angle using bound B. If bound 'B' equals zero, the quantized residual '$Q\varphi_{res}$' is zero, hence, no coding is needed. Otherwise, a flag is encoded to indicate if '$Q\varphi_{res}$' is equal to zero. If '$Q\varphi_{res}$' is nonzero, a sign bin is encoded. Then, if bound 'B' equals one, '$Q\varphi_{res}$' is either minus one or one, hence, no more encoding is needed. Otherwise, a flag is encoded to indicate if the absolute value of '$Q\varphi_{res}$' is equal to one. If the absolute value of '$Q\varphi_{res}$' is not equal to one, but bound 'B' equals two, '$Q\varphi_{res}$' is either minus two or two, and encoding stops. Otherwise, the remainder (i.e., '$|Q\varphi_{res}|-2$') is encoded using an expGolomb code. The number of entropy encoding contexts may be equal to 24.

A process for scaling azimuthal angle step is now discussed. In G-PCC Ed.1 a cartesian coordinates prediction $(x_{pred}, y_{pred})$ may be obtained using the following equation:

$$(x_{pred}, y_{pred}) = (\text{round}(r_{2D-rec} * \cos(\varphi_{rec})), \text{round}(r_{2D-rec} * \sin(\varphi_{rec}))) \quad (7)$$

In the equation above, '$\varphi_{rec}$' is the reconstructed azimuthal angle and '$r_{2D-rec}$' is a reconstructed radius.

If implemented as an addition to the processes presented above, '$\varphi_{rec} = \varphi_{pred} + IQ_\varphi(Q_\varphi(\varphi_{res}, r), r)$', with '$Q_\varphi$' the adaptive quantization of azimuthal angle described in the section titled "Adaptive Azimuthal Angle Quantization.", '$IQ_\varphi$' the inverse quantization, and '$\varphi_{res}$' the azimuthal angle residual of the prediction.

In G-PCC Ed.1 and above processes, '$r_{2D-rec} = r<<\text{geom\_angular\_radius\_inv\_scale\_log 2}$'; in comparison to the coded point cloud cartesian precision, the radius 'r' which is internally used in, and coded by, the codec has a precision reduced by a number of bits equal to 'geom_angular_radius_inv_scale_log 2' obtained from the geometry parameter set (this is equivalent to a quantization of the radius).

A process of enabling scaling of azimuth angle step is now discussed. If both the improved quantization of azimuthal angle as presented above and the improved azimuthal angle residual coding as presented above are implemented, the bound '$B = Q_\varphi(\varphi_{step}/2, r)$' (see above), which is computed for each point for entropy (de)coding, is used to enable the scaling of the azimuthal angle step. If the integer bound 'B' is equal to 0 or equivalently 'B<1', then:

$$\varphi_{pred} = k * S(\varphi_{step}, r) + \varphi_{-n}, \quad (8)$$

where '$S(\varphi_{step}, r)$' is a scaled azimuthal angle step.

A process for computing a scaled azimuth angle step is now discussed. In order to code an optimal number 'k' of scaled azimuthal angle steps '$S(\varphi_{step}, r)$', an optimal '$S(\varphi_{step}, r)$' would become:

$$S(\varphi_{step}, r) = 2^{geom\_angular\_azimuth\_scale\_log2}/(r<<3) \quad (9)$$

One issue with equation (9) is that equation (9) requires an integer division in decoder 300. Therefore, an approximation of the division in $S(\varphi_{step}, r)$ is implemented. To compute the approximation, the highest power is used of the '$2^n$' factor of '$\varphi_{step}$' such that '$2^n * \varphi_{step} < 2^{geom\_angular\_azimuth\_scale\_log 2}/(r<<3)$'.

The scaled azimuthal angle step '$2^n * \varphi_{step}$' can be obtained by iteratively scaling '$\varphi_{step}$' and '$\varphi_{step}*(r<<3)$' by '$2^n$', starting from 'n=0', and using successive bitwise shift of 1 bit operations on both '$2^n * \varphi_{step}*(r<<3)$' and '$2^n * \varphi_{step}$' while '$2^n * \varphi_{step}*(r<<3)$' is lower than $2\pi$ angle (i.e. '$2^{geom\_angular\_azimuth\_scale\_log 2}$') as follows:

```
auto rec_radius_scaling = pred[0] + residual[0] << 3; // ~r*2*pi
auto azimuthSpeed = _geomAngularAzimuthSpeed;
if (rec_radius_scaling && rec_radius_scaling < Th0) {
  const int32_t pi = 1 << _geom_angular_azimuth_scale_log2 - 1;
  int32_t speed_r = azimuthSpeed*rec_radius_scaling;
  while (speed_r < pi) {
    speed_r <<= 1;
    azimuthSpeed <<= 1;
  }
}
```

Then, in encoder 200, the number of azimuthal steps 'qphi', and in both encoder 200 and decoder 300, the azimuthal angle predictor updated by the number of azimuthal angle steps 'pred[1]', are computed using 'azimuthSpeed' instead of '_geomAngularAzimuthSpeed=gps.geom_angular_azimuth_speed_minus1+1' as follows:

```
-qphi = residual[1] >= 0 ? (residual[1] + (_geomAngularAzimuthSpeed >> 1))
-                      / _geomAngularAzimuthSpeed
-                      : -(-residual[1] + (_geomAngularAzimuthSpeed >> 1))
-                      / _geomAngularAzimuthSpeed;
-pred[1] += qphi * _geomAngularAzimuthSpeed;
+qphi = residual[1] >= 0 ? (residual[1] + (azimuthSpeed >> 1))
+                      / azimuthSpeed
+                      : -(-residual[1] + (azimuthSpeed >> 1))
+                      / azimuthSpeed;
+pred[1] += qphi * azimuthSpeed;
residual[1] = point[1] - pred[1];
```

Radius residual sign coding is now discussed. In the predictive geometry encoder, the sign of a radius residual is encoded with a single entropy coding context. Because the radius residual sign should be more or less piecewise constant when the radius is predicted from the preceding point radius (i.e., parent node in the predictive tree), the sign probability would be highly correlated with the sign value of the radius of preceding encoded point, when the parent node is used as a predictor. Moreover, this probability should increase when the successively coded points have similar azimuthal angle (i.e., the number of azimuthal steps encoded in the bitstream and added to the predictor is zero).

Therefore, the presented method uses a table of 2×2×2×2 (i.e., 16) contexts as follows:

$$ctx_{sign} = ctxTab[I_{previous}][I_{penulm}][I_{last}][s_{res,prec}] \qquad (10)$$

where 'ctxTab' it the table of contexts, '$I_{previous}$' is a Boolean value indicating if the selected predictor is the parent node, '$I_{penulum}$' is a Boolean value indicating if the coded number of azimuthal steps for preceding point is equal to zero, '$I_{last}$' is a Boolean value indicating if the coded number of azimuthal steps for the current point is equal to zero, and '$s_{res,prec}$' is a Boolean value indicating the sign of the last coded radius residual.

Figure 18:
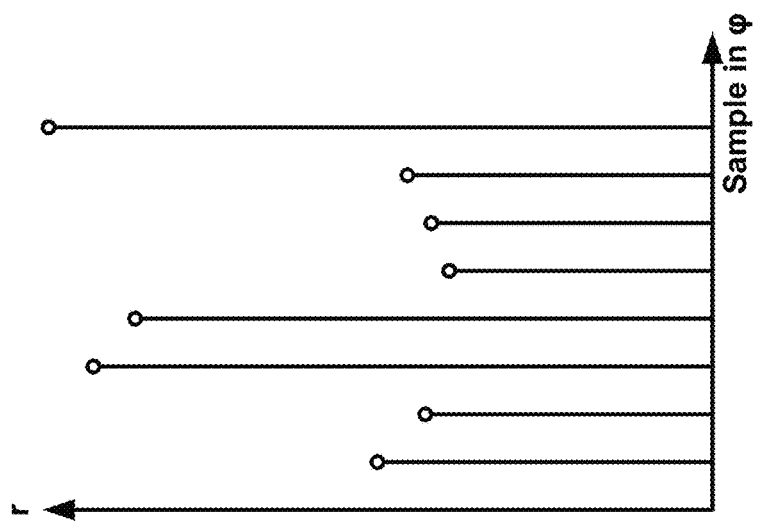
FIG. 18 is a conceptual diagram illustrating an example of a laser probing two different objects.
Figure 18:
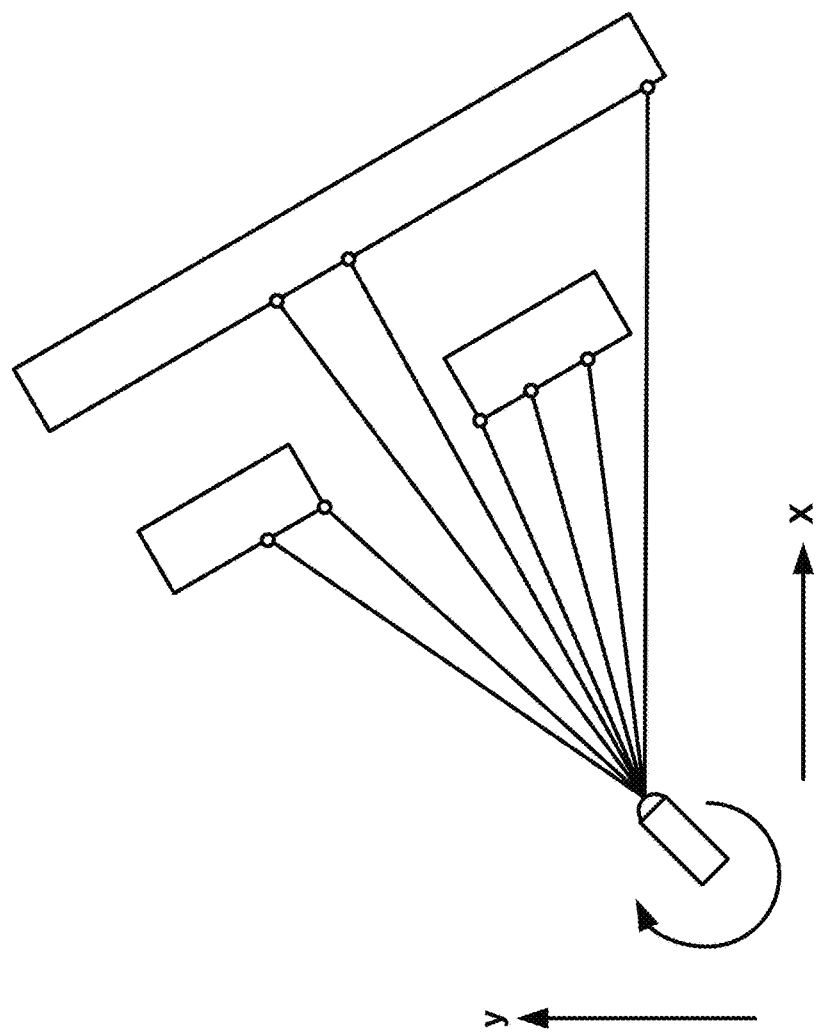

A predictor list is now discussed. A dynamic list of predictors is derived to perform better prediction after a laser beam has moved from a first object, with a first distance, to another object, with a different distance, has passed over it and is passing back to the first object. It may occur, for instance, when one object is in front of another one (like a car in from of a wall, for instance), or when an object has holes (walls with open doors or windows, or entrance wall for instance), e.g., as illustrated by FIG. 18. FIG. 18 is a conceptual diagram illustrating an example of a laser probing two different objects.

Instead of using the list of G-PCC predictors, a list of N predictors is built from a prediction buffer (e.g., prediction buffer) of N pairs of one radius and one azimuthal angle ($r_n$, $\varphi_n$). The predictors derivation is detailed above and the buffer management is also detailed above. The coding of the predictor index may be performed using a unary coding with one context per predictor index.

The derivation of a predictor is performed as follows:
If the point being predicted is the first point of the tree (i.e., there is no parent node), the predictor $PR_0$ is set equal to ($r_{min}$, 0, 0), the other predictors $PR_{n>0}$ are set equal to (0, 0, 0).
If the point has a parent point,
  a. the predictor $PR_0$ is set equal to ($r_0$, $\varphi_0$, $\theta 0$), where $\theta_0$ is the laser index $\theta$ value of the parent point p0 coded in the parent node, and where ($r_0$, $\varphi_0$) is the first pair in the buffer (as will be understood from the buffer management, it is also equal to respectively the radius r, and the azimuthal angle $\varphi$ of the parent point p0 coded in the parent node);
  b. the predictors $PR_{n>0}$ are set equal to ($r_n$, $\varphi_n + k \cdot \varphi_{step}$, $\theta_0$), where $\theta_0$ is the laser index $\theta$ value of the parent point p0 coded in the parent node, and where ($r_n$, $\varphi_n$) is the n-th pair in the buffer, and k equals 0 if $|\varphi_0 - \varphi_n| < \varphi_{step}$, else k equals the integer division ($\varphi_0 - \varphi_n$)/($\varphi_{step}$).

Since it is better to avoid integer division in decoder 300, ($\varphi_0 - \varphi_n$)/$\varphi_{step}$ may be approximated using the divApprox function of G-PCC: k=divApprox($\varphi_0 - \varphi_n$, $\varphi_{step}$, 0).

The buffer used for the derivation of predictors may be managed as follows. Each pair of the buffer is first initialized to (0, 0). After the (de)coding of a point, encoder 200 or decoder 300 may update the buffer as follows:

a. If the absolute value of (de)coded radius residual $r_{res}$ is higher than a threshold Th, encoder 200 or decoder 300 may determine that the laser has probed a new object. Encoder 200 or decoder 300 may then insert a new element ($r_0$, $\varphi_0$) at the front of the buffer, with $r_0$ and $\varphi_0$ denoting the reconstructed radius and the reconstructed azimuthal angle of the (de)coded point, respectively. Encoder 200 or decoder 300 may discard the last element of the buffer. Encoder 200 or decoder 300 may discard the last element of the buffer by letting the buffer element ($r_n$, $\varphi_n$) be equal to ($r_{n-1}$, $\varphi_{n-1}$) for n=3 to 1. Encoder 200 or decoder 300 may then set the first buffer element values from the decoded point.
  b. If the absolute value of (de)coded $r_{res}$ is not higher than the threshold Th, encoder 200 or decoder 300 may determine that the laser has probed an object present in the buffer. Encoder 200 or decoder 300 may then move the element of the buffer with index predIdx (which corresponds to the index of the predictor that has been used for the prediction) to the front of the buffer. Encoder 200 and decoder 300 may update the buffer to include ($r_0$, $\varphi_0$), i.e., the reconstructed radius and the reconstructed azimuthal angle of the (de)coded point. Encoder 200 and decoder 300 may perform this by letting the buffer elements ($r_n$, $\varphi_n$) be equal to ($r_{n-1}$, $\varphi_{n-1}$) for n=predIdx to 1, then, setting the first buffer element values from the decoded point.
  c. The threshold Th may be equal to gps.predgeom_radius_threshold_for_pred_list and has been fixed in the encoder to 2048>>ps.geom_angular_radius_inv_scale_log 2. gps.predgeom_radius_threshold_for_pred_list is the syntax element that indicates the threshold value Th. s·geom_angular_radius_inv_scale_log 2 is a precision value (i.e., number of bits) that is used in some intermediate derivations (particularly relating to spherical to cartesian conversion, or vice versa) for the radius component.

Processes of encoding and decoding the magnitude of radius residual is now discussed. These processes may improve the magnitude encoding of radius residual in G-PCC's predictive tree geometry coding for LIDAR-acquired point cloud compression.

Figure 19:
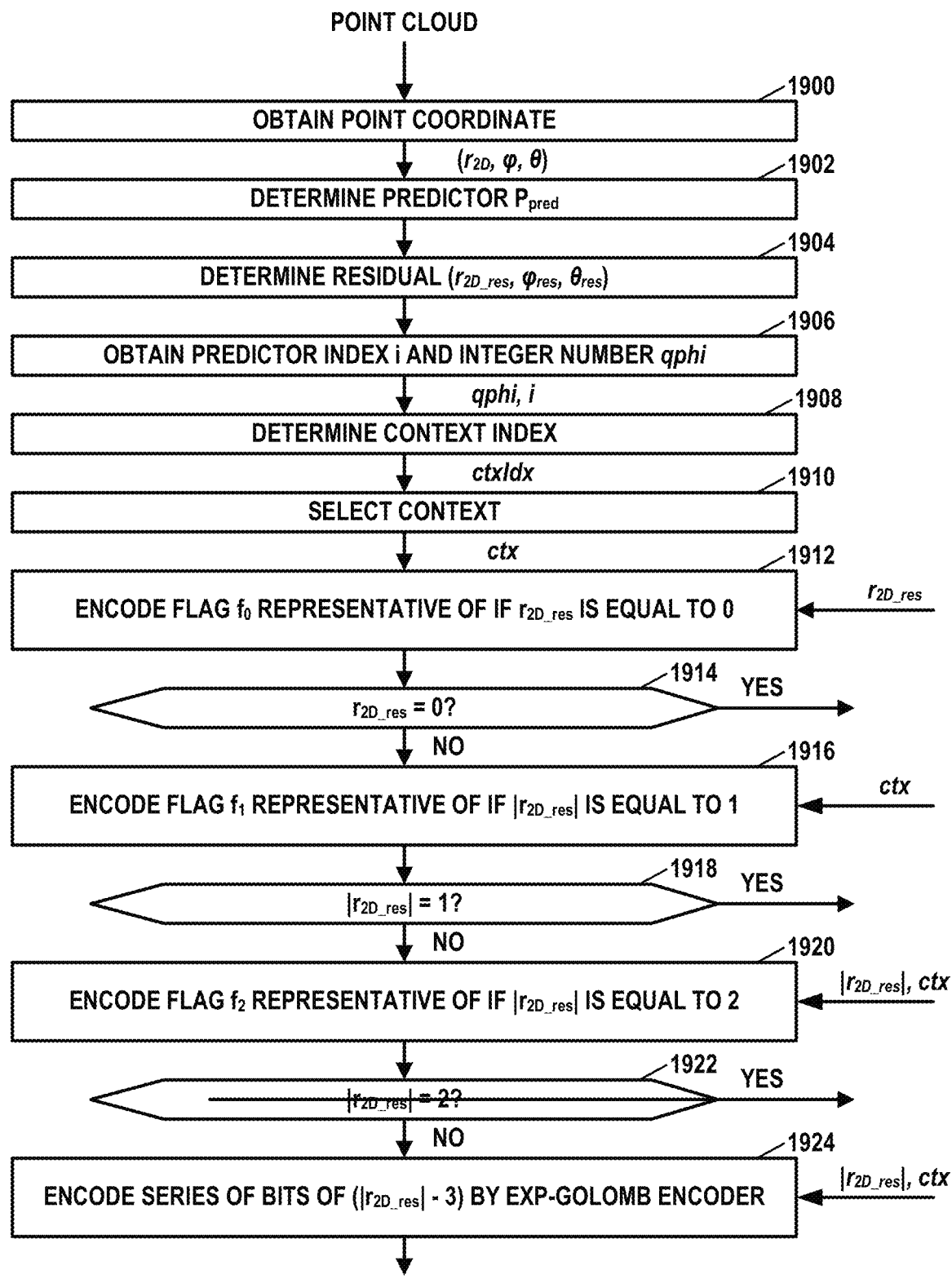
FIG. 19 is a flowchart illustrating an example encoding method of magnitude of radius residual.

FIG. 19 is a flowchart illustrating an example encoding method of magnitude of radius residual. In the example of FIG. 19, encoder 200 uses a context-adaptive entropy encoder to encode bits of magnitude of radius residual and may determine a context according to the context determination process described elsewhere in this disclosure.

As shown in FIG. 19, encoder 200 may obtain a point having coordinates $(r_{2D}, \varphi, \theta)$ (1900). Encoder 200 may then determine a predictor $P_{pred}$ (1902). Encoder 200 may use the coordinates of the point and coordinates of the predictor $P_{pred}$ to determine a residual (1904). The residual may be specified by values $(r_{2D\_res}, \varphi_{res}, \theta_{res})$. For instance, encoder 200 may subtract corresponding coordinate values of the point and the predictor to determine the residual. Additionally, encoder 200 may obtain a predictor index i and an integer number qphi (1906). For example, encoder 200 may select predictor index i based on a review of one or more possible values of i to determine which provides the best performance. The integer number qphi is a quantized value of the azimuth residual. Encoder 200 may then determine a context index ctxIdx (1908). Encoder 200 may select a context ctx based on the context index ctxIdx (1910). An example process for determining context index ctxIdx, and context ctx are provided below.

After obtaining the radius residual, encoder 200 may determine a value of a flag $f_0$, a binary entropy encoder may encode the value of flag $f_0$ based on context ctx, and encoder 200 may signal the encoded value of flag $f_0$ in geometry bitstream 203 (1912). The value of flag $f_0$ is representative of whether the radius residual $r_{2D\_res}$ is equal to 0.

Encoder 200 may then determine whether the radius residual $r_{2D\_res}$ is equal to 0 (1914). If the radius residual $r_{2D\_res}$ is equal to 0 ("YES" branch of 1914), the encoding of radius residual $r_{2D\_res}$ is finished because $r_{2D\_res}=0$ is encoded. Otherwise, if the radius residual $r_{2D\_res}$ is not equal to 0 ("NO" branch of 1914), encoder 200 may determine a value of a flag $f_1$, encoder 200 may perform entropy encoding on the value of flag $f_1$ based on the context ctx, and encoder 200 may include the entropy encoded value of flag $f_1$ in geometry bitstream 203 (1916). Flag $f_1$ is representative of whether the absolute value $|r_{2D\_res}|$ is equal to 1.

Encoder 200 may then determine if the absolute value $|r_{2D\_res}|$ is equal to 1 (1918). If the absolute value $|r_{2D\_res}|$ is equal to 1 ("YES" branch of 1918), encoder 200 has finished encoding of magnitude of radius residual $r_{2D\_res}$. Otherwise, if the absolute value $|r_{2D\_res}|$ is not equal to 1 ("NO" branch of 1918), encoder 200 determines the value of a flag $f_2$, arithmetic encoding unit 214 of encoder 200 performs binary entropy encoding on the value of flag $f_2$ based on the context ctx, and encoder 200 signals the entropy-encoded value of flag $f_2$ is geometry bitstream 203 (1920). The flag $f_2$ is representative of whether the absolute value $|r_{2D\_res}|$ is equal to 2 or not.

Encoder 200 may then determine if the absolute value $|r_{2D\_res}|$ is equal to 2 (1922). If the absolute value $|r_{2D\_res}|$ is equal to 2 ("YES" branch of 1922), encoder 200 has finished encoding the magnitude of radius residual $r_{2D\_res}$. Otherwise, if the absolute value $|r_{2D\_res}|$ is not equal to 2 ("NO" branch of 1922), encoder 200 may use exp-Golomb coding to encode the absolute value $(|r_{2D\_res}|-3)$ based on the selected context ctx (1924).

Figure 20:
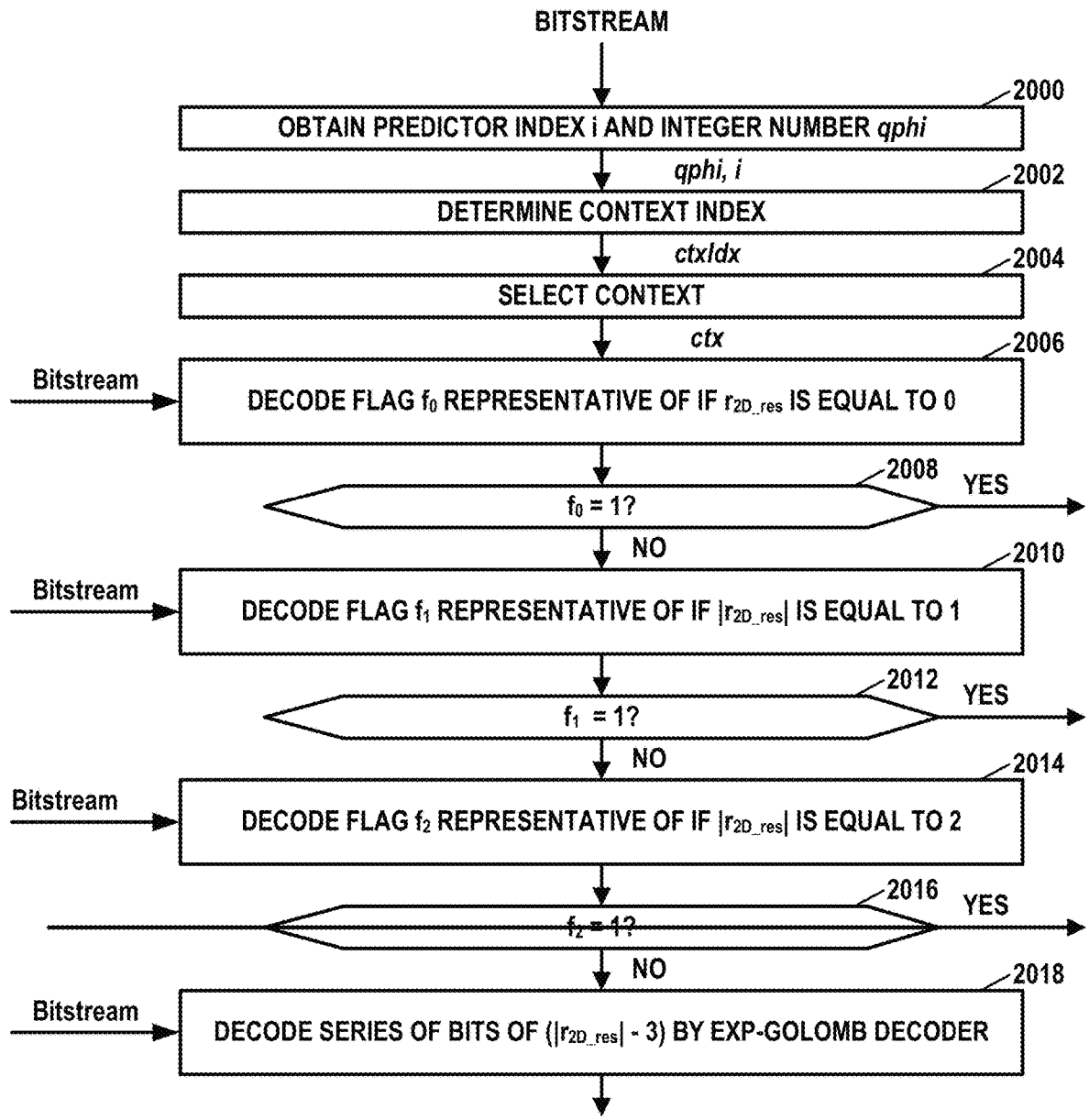
FIG. 20 is a flowchart illustrating an example decoding method of magnitude of radius residual.

The overview of proposed decoding method of magnitude of radius residual is shown in FIG. 20. FIG. 20 is a flowchart illustrating an example decoding method of magnitude of radius residual. In the example of FIG. 20, decoder 300 may receive a bitstream (e.g., geometry bitstream 203). Decoder 300 may obtain from the bitstream a predictor index i and an integer number qphi for a point (2000). Decoder 300 may then determine a context index ctxIdx (2002). Decoder 300 may select a context ctx based on the context index ctxIdx (2004). An example process for determining context index ctxIdx, and context ctx are provided below.

Decoder 300 may decode a value of a flag $f_0$ from the bitstream (2006). Decoder 300 may use the context ctx to decode the value of flag $f_0$. The flag $f_0$ is representative of whether a residual $r_{2D\_res}$ is equal to 0. Decoder 300 may then determine whether flag $f_0$ is equal to 1 (2008). If the value of flag $f_0$ is equal to 1 ("YES" branch of 2008), decoder 300 has finished decoding residual $r_{2D\_res}$. Otherwise, if the value of flag $f_0$ is not equal to 1 ("NO" branch of 2008), decoder 300 may decode a value of a flag $f_0$ from the bitstream (2010). Decoder 300 may use the context ctx to decode the value of flag $f_1$. The flag $f_1$ is representative of whether the residual $r_{2D\_res}$ is equal to 1. Decoder 300 may then determine whether flag $f_1$ is equal to 1 (2012). If the value of flag $f_1$ is equal to 1 ("YES" branch of 2012), decoder 300 has finished decoding residual $r_{2D\_res}$.

Otherwise, if the value of flag $f_1$ is not equal to 1 ("NO" branch of 2012), decoder 300 may decode a value of a flag $f_2$ from the bitstream (2014). Decoder 300 may use the context ctx to decode the value of flag $f_2$. The flag $f_2$ is representative of whether a residual $r_{2D\_res}$ is equal to 2. If the value of flag $f_2$ is equal to 1 ("YES" branch of 2016), decoder 300 has finished decoding residual $r_{2D\_res}$. Otherwise, if the value of flag $f_2$ is not equal to 1 ("NO" branch of 2016), an exp-Golomb decoder of decoder 300 may decode a series of bits from the bitstream (2018). The series of bits indicates an absolute value of $|r_{2D\_res}|-3$).

As mentioned above, encoder 200 and decoder 300 determine a context index ctxIdx and a context ctx. A process of determining the context ctx is now discussed. To encode each bit of radius residual magnitude (e.g., $r_{2D\_res}$), encoder 200 and decoder 300 determine a context index ctxIdx by using a predictor index i and the integer number qphi of elementary azimuthal step according to equation below, $$ctxIdx = \begin{cases} 0, & \text{if } i \neq 0 \text{ and } qphi = 0 \\ 1, & \text{if } i \neq 0 \text{ and } qphi \neq 0 \\ 2, & \text{if } i = 0 \text{ and } qphi = 0 \\ 3, & \text{if } i = 0 \text{ and } qphi \neq 0 \end{cases} \quad (11)$$

and then select a context ctx in context table ctxTable_T to entropy encode the bits of magnitude of radius residual according to ctxIdx.

$$ctx = \text{ctxTable\_T}[ctxIdx] \quad (12)$$

The following describes dependence of qPhi on azimuth Speed. For some techniques, it is proposed to add new contexts to the adaptive models for the coding of 'k' based on:
  a. The intra predictor index
  b. An estimation of the number of times the azimuth speed is increased.

This requires to calculate this estimation both at the encoder and decoder.

This is done by adding the following source code:

```
r = pred[0]:
auto azimuthSpeed__ = __geomAngularAzimuthSpeed;
int recordAzimuthSpeed = 0;
r = r << 3;
auto speedTimesR = int64_t(azimuthSpeed__) * r;
int phiBound = divExp2RoundHalfInf(speedTimesR,
    _azimuthTwoPiLog2 + 1);
if (r && !phiBound) {
    recordAzimuthSpeed++;
    const int32_t pi = 1 << (_azimuthTwoPiLog2 - 1);
    int32_t speedTimesR32 = speedTimesR;
    while (speedTimesR32 < pi && recordAzimuthSpeed < 4) {
        speedTimesR32 <<= 1;
        azimuthSpeed__ <<= 1;
        record AzimuthSpeed++;
    }
}
```

The new calculated parameter (recordAzimuthSpeed, also referred as azimuthSpeedIndex) and the Intra prediction index are used as additional parameters in the functions in charge of encoding, decoding or estimating the cost of qPhi.

The new context is defined by:

```
int interCtxIdx = interFlag ? 2 : 0;
int interCtxIdx__ = interFlag ? 6 : 0;
if (interFlag){
    interCtxIdx__ += azimuthSpeedIndex;
}else{
    if (azimuthSpeedIndex > 0)
        interCtxIdx__ += azimuthSpeedIndex + 1;
    else{
        if (predIdx != 0){
            interCtxIdx = 1;
            interCtxIdx__ = 1;
        }
    }
}
```

The value of interCtxIdx is then used in the parsing of syntax elements associated with qphi, such as ptn_phi_mul_abs_prefix (greater than 0 and greater than 1), ptn_phi_mul_abs_minus2, ptn_phi_mul_abs_minus9 and ptn_phi_mul_sign.

The following describes dependence on reconstructed radius. It is found that the distribution of $\Delta\Delta\varphi$ is correlated with the radius of that node. FIGS. 21A and 2B classify points in LiDAR point clouds to points with/without sudden radius I change, and shows the r-$\Delta\Delta\varphi$ relationship. Points with sudden change is defined as points with large prediction residual $\Delta r$:

$\Delta r/r >$ threshold $T$, where T is a pre-defined threshold.

Figure 21B:
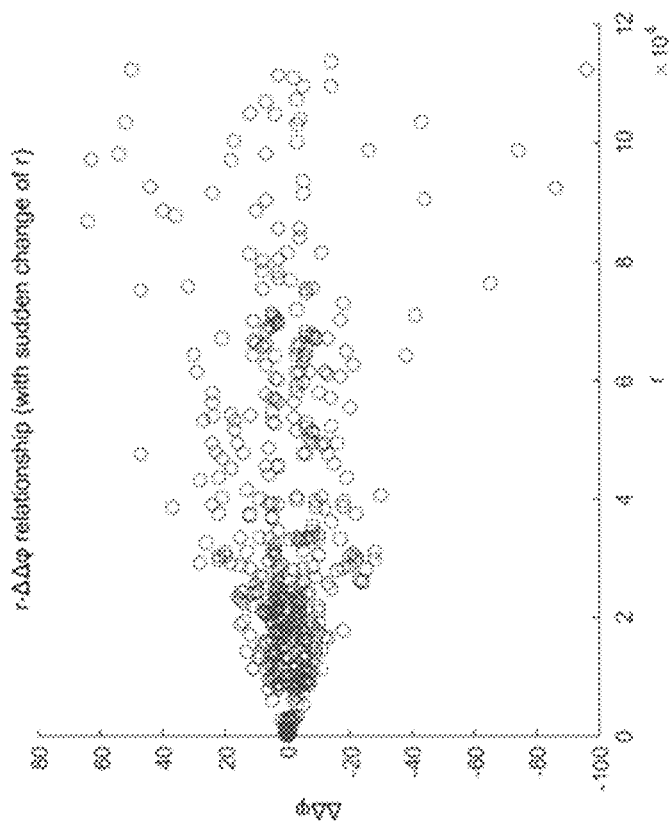
FIGS. 21A and 21B are graphs illustrating r-$\Delta\Delta\phi$ relationship.
Figure 21A:
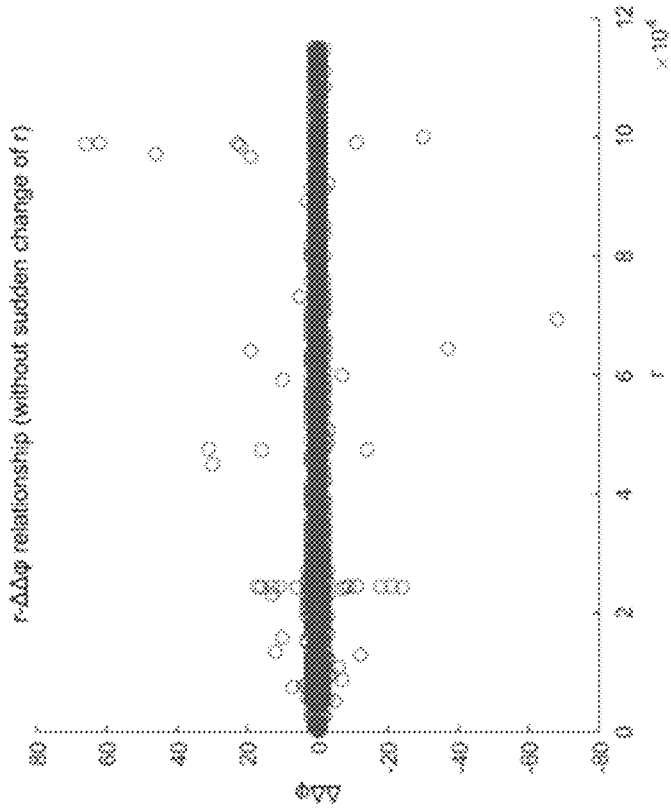

As shown in FIGS. 21A and 21B, points without sudden radius change tend to have small and stable $\Delta\Delta\varphi$ values around zero, while points with sudden radius change have more variable $\Delta\Delta\varphi$ value. As such, whether radius changes dramatically can be used as the indicator of the amplitude of $\Delta\Delta\varphi$.

An example implementation of the above observation is to incorporate the above indication as contexts when coding resPhi. The modified context modelling is as follows:

To code whether resPhi=0 or abs(resPhi)=1, following contexts are used:
 a. The prediction mode (inter or intra) of the node; and
 b. Whether the predictor index of the node equals to zero.
 c. whether radius changes dramatically To code the value of abs(resPhi)-2 with exp-Golomb coding, following contexts are used:
 a. The prediction mode (inter or intra) of the node;
 b. whether boundPhi-3>6;
 c. whether radius changes dramatically
 d. count of coded bins in prefix or suffix of exp-Golomb codeNum.

There may be certain issues with some techniques. As described above for the coding of azimuthal angle residual (e.g., description of "coding of the azimuth angle residual is now discussed"), the value of the azimuth bound B was used to code the azimuth residual—both for signaling syntax elements as well as choosing contexts. The context for coding the remainder (i.e., '|Qφres|-2') also uses the value of bound B.

Then, coding is performed as illustrated in FIG. 17. If bound 'B' equals zero, the quantized residual 'Qφres' is zero, hence, no coding is needed. Otherwise, a flag is coded to indicate if 'Qφres' is equal to zero. If it is nonzero, a sign bin is coded. Then if bound 'B' equals one, 'Qφres' is either minus one or one, hence, no more coding is needed. Otherwise, a flag is coded to indicate if the absolute value of 'Qφres' is equal to one. If it is not, but bound 'B' equals two, 'Qφres' is either minus two or two, and coding stops. Otherwise, the remainder (i.e., '|Qφres|-2') is coded using an expGolomb code. The number of entropy coding contexts is equal to 24.

The implementation is as follows:

```
if (boundPhi == 0)
    return 0;
int interCtxIdx = interFlag ? 1 : 0;
int ctxL = interFlag ? (refNodeIdx > 1 ? 1 : 0) : (predIdx ? 1 : 0);
//int ctxL = predIdx ? 1 : 0;
if (!_aed->decode(_ctxResPhiGTZero[interCtxIdx][ctxL]))
    return 0;
int absVal = 1;
if (boundPhi > 1)
    absVal += _aed->decode(_ctxResPhiGTOne[interCtxIdx][ctxL]);
int interEGkCtxIdx = interFlag ? (refNodeIdx > 1 ? 2 : 1) : 0;
if (absVal == 2 && boundPhi > 2)
    absVal += _aed->decodeExpGolomb(1,
    _ctxResPhiExpGolombPre[interEGkCtxIdx][boundP-i - 3 > 6],
    _ctxResPhiExpGolombSuf[interEGkCtxIdx][boundP-i - 3 > 6]);
```

The value of bound B is calculated as follows:
First, bound 'B=Qφ(φstep/2, r)' is computed for each point as follows:

```
const int rec_radius_scaling = rPred + residual[0] << 3; // ~r*2*pi
auto speed_r =
int64_t(_geomAngularAzimuthSpeed)*rec_radius_scaling;
int phiBound = divExp2RoundHalfInf(speed_r,
    _geom_angular_azimuth_scale_log2+1);
```

The value of rPred is the predicted residual, and may require the reconstructed radius of the previous point(s) in decoding order. This may mean that in order to parse the azimuth residual (e.g., azimuthal angle residual value), the reconstructed value of the radii of the preceding point(s) is(are) necessary. This results in a dependence of the parsing of syntax elements on the reconstruction of the points. Typically, many systems parse NAL units/syntax structures independently of the decoding/reconstruction. This allows the parsing module to be simple, and independent. If there is dependence on reconstruction, the parsing system has to include a decoding/reconstruction module, or has to be tightly coupled with the decoding/reconstruction module. In many systems, this is undesirable, expensive and impractical.

Similarly, in above description for dependence of qPhi on azimuth speed (e.g., above description for "the following describes dependence of qPhi on azimuth Speed"), the context of qphi syntax elements is dependent on azimuthSpeedIndex and speedTimesR which in turn are dependent on the reconstructed radius—thus creating dependence of parsing on decoding/reconstruction.

Similarly, in above description of dependence on reconstructed radius (e.g., above description for "the following describes dependence on reconstructed radius"), the context of coding resPhi syntax elements is dependent on reconstructed radius (when checking whether radius changes dramatically), thus creating the dependence of parsing on decoding/reconstruction.

In accordance with one or more examples, point cloud encoder 200 may signal and point cloud decoder 300 may parse information for an azimuthal angle residual value for a current point of a point cloud independent of a radius value of the current point or a radius value of a previous point of the point cloud that is previous to the current point in decoding order. In this way, the issues associated with dependency of parsing on decoding/reconstruction may be minimized.

For instance, as illustrated in FIG. 17, if B is equal to zero, then point cloud decoder 300 does not parse the azimuthal angle residual value. Therefore, whether point cloud decoder 300 parses the azimuthal angle residual value or not is dependent (e.g., conditioned) on the value of B. In this disclosure, the variable "B" is the same as boundPhi or phiBound. That is, the disclosure uses the variable B, boundPhi, and phiBound interchangeably.

As described above, the value of boundPhi (i.e., B or phiBound) is based on the value of speed_r. For example, int phiBound equals divExp2RoundHalfInf(speed_r, _geom_angular_azimuth_scale_log 2+1). Also, speed_r is based on rec_radius_scaling. For example, auto speed_r equals int64_t(_geomAngularAzimuthSpeed)*rec_radius_scaling. The value of rec_radius_scaling is based on rPred. For example, const int rec_radius_scaling=rPred+residual[0] <<3. As described above, the value of rPred is the predicted residual, and requires reconstructed radius of previous point(s).

Therefore, phiBound (i.e., B or boundPhi) is based on reconstructed radius of previous point(s). This means that if point cloud decoder 300 parsing the azimuthal angle residual value is dependent upon phiBound (i.e., B or boundPhi), then whether point cloud decoder 300 parses the azimuthal angle residual value is dependent upon a radius value of a previous point of the point cloud.

In accordance with one or more examples described in this disclosure, point cloud encoder 200 may signal and point cloud decoder 300 may parse information for an azimuthal angle residual value for the current point independent of a radius value of the current point or a radius value of a previous point of the point cloud that is previous to the current point in decoding order. That is, point cloud decoder 300 may parse and point cloud encoder 200 may signal the information for the azimuthal angle residual value independent of whether a condition that is based on the radius value of the current point or the radius value of the previous point is satisfied.

For instance, point cloud decoder 300 may parse and point cloud encoder 200 may signal the information for the azimuthal angle residual value independent of whether the value of boundPhi (i.e., B or phiBound) is equal to zero or not. That is, the parsing or signaling of the information for the azimuthal angle residual value is not conditioned on the value of boundPhi. Again, the value of boundPhi is based on radius value of the current point or the radius value of the previous point. Therefore, by parsing or signaling signal the information for the azimuthal angle residual value independent of whether the value of boundPhi (i.e., B or phiBound) is equal to zero or not, point cloud decoder 300 may parse and point cloud encoder 200 may signal the information for the azimuthal angle residual value independent of whether a condition that is based on the radius value of the current point or the radius value of the previous point is satisfied.

Furthermore, point cloud encoder 200 and point cloud decoder 300 may determine one or more context values for encoding or decoding the azimuthal angle residual value for the current point independent of the radius value of the current point or the radius value of the previous point of the point cloud. Point cloud encoder 200 and point cloud decoder 300 may context based encode or decode the azimuthal angle residual value for the current point based on the one or more context values.

For instance, as indicated in the above pseudo-code, in some techniques, whether point cloud decoder 300 parses "ctxResPhiGTOne[interCtxIdx][ctxL]" (e.g., a context value) is based on the value of boundPhi (e.g., based on the value of boundPhi being greater than 1). If boundPhi is greater than 2, then point cloud decoder 300 may parse context values (e.g., ctxResPhiExpGolombPre[interEGkCtxIdx] and ctxResPhiExpGolombSuf[interEGkCtxIdx]) with the additional condition of whether boundPhi−3>6. In one or more examples, point cloud decoder 300 may parse the context values independent of the value of boundPhi. That is, point cloud decoder 300 may not need to first determine whether boundPhi is greater than 1, greater than 2, or whether boundPhi—3>6 to determine the context values.

As described above, in some techniques, the quantization parameter may be based on the radius value of current point or the radius value of a previous point. In one or more examples, point cloud encoder 200 and point cloud decoder 300 may determine a quantization parameter for the azimuthal angle residual value for the current point independent of the radius value of the current point or the radius value of the previous point of the point cloud. Point cloud encoder 200 may quantize and point cloud decoder 300 may de-quantize the azimuthal angle residual value based on the quantization parameter.

There may be various ways in which to remove the dependency of whether the azimuthal angle residual value is parsed or signaled from the radius value of the current point or the radius value of the previous point. The following describes examples using a flag to indicate that the parsing of azimuthal angle residual value is independent of the radius value of the current point or the radius value of the previous point. However, the use of a flag is provided merely as an example, and should be considered limiting.

There may be other ways, including where a flag is not included, to remove the dependency of the radius value of the current point or the radius value of the previous point from the parsing or signaling of the azimuthal angle residual value. For example, a syntax element is added to specify whether the parsing of azimuth residual (i.e., azimuthal angle residual value) is independent on the values of reconstructed syntax elements (e.g., reconstructed radius of current/preceding points).

For example, a flag azimuth_indep_flag may specify whether the parsing of azimuth residual is independent/dependent on the values of reconstructed syntax elements. When the flag takes one value (e.g., 0), the parsing of azimuth residual is independent of the value of the reconstructed syntax elements; the flag takes one value (e.g., 0), the parsing of azimuth residual may be dependent on the value of the reconstructed syntax elements.

This may be implemented as follows:

Coding is performed as illustrated in FIG. 17. If bound 'B' equals zero and azimuth_indep_flag is equal to 0, the quantized residual 'Qφres' is zero, hence, no coding is needed. Otherwise, a flag is coded to indicate if 'Qφres' is equal to zero. If it is nonzero, a sign bin is coded. Then if bound 'B' equals one and azimuth_indep_flag is equal to 0, 'Qφres' is either minus one or one, hence, no more coding is needed. Otherwise, a flag is coded to indicate if the absolute value of 'Qφres' is equal to one. If it is not, but bound 'B' equals two and azimuth_indep_flag is equal to 0, 'Qφres' is either minus two or two, and coding stops. Otherwise, the remainder (i.e., '|Qφres|−2') is coded using an expGolomb code. The number of entropy coding contexts is equal to 24.

The context for coding remainder may also be updated as follows:

```
if (boundPhi == 0 && !azimuth_indep_flag)
    return 0;
int interCtxIdx = interFlag ? 1 : 0;
int ctxL = interFlag ? (refNodeIdx > 1 ? 1 : 0) : (predIdx ? 1 : 0);
//int ctxL = predIdx ? 1 : 0;
if (!_aed->decode(_ctxResPhiGTZero[interCtxIdx][ctxL]))
    return 0;
int absVal = 1;
if (azimuth_indep_flag ? 1: boundPhi > 1)
    absVal + = _aed->decode(_ctxResPhiGTOne[interCtxIdx][ctxL]);
int interEGkCtxIdx = interFlag ? (refNodeIdx > 1 ? 2 : 1) : 0;
if (absVal == 2 && (azimuth_indep_flag ? 1: boundPhi > 2))
    absVal + = _aed->decodeExpGolomb(1,
_ctxResPhiExpGolombPre[interEGkCtxIdx][
azimuth_indep_flag ? 0: boundPhi
− 3 > 6 ], _ctxResPhiExpGolombSuf[interEGkCtxIdx][
azimuth_indep_flag ? 0:
boundPhi − 3 > 6]);
```

The flag may be signaled in parameter set (e.g., SPS, GPS, etc.) or a slice header. The signaling of the flag may be conditioned on whether angular mode is enabled.

In one example, a syntax element may be signaled to indicate that the parsing of syntax structures (e.g., slice or brick) is independent of decoding/reconstruction of one or more components of one or more points in the point cloud. When this syntax element takes one value (e.g., 1), then parsing can be performed independent of the decoding/reconstruction of points. When this syntax element takes another value (e.g., 0), then parsing of the syntax structures may be dependent on the reconstruction/decoding of one or more points in the point cloud.

In one example, the independence of parsing from decoding/reconstruction may only be restricted to decoding/reconstruction of points in the current frame.

In one example, syntax element may be signaled (and hence the restriction applied) only when predictive geometry is used to code the point cloud.

When there is indication that parsing is independent of reconstruction/decoding (e.g., flag parsing_independent_of_reconstruction_flag), dependence of qphi on azimuth speed (described above) may be disallowed. The derivation of context used in decoding qphi may be updated as follows:

The new context is defined by:

```
int interCtxIdx = interFlag ? 2 : 0;
int interCtxIdx_ = interFlag ? 6 : 0;
if (interFlag){
    if(!parsing_ independent_of_reconstruction_flag)
    interCtxIdx_ += azimuthSpeedIndex;
    }else{
        if (!parsing_ independent_of_reconstruction_flag &&
    azimuthSpeedIndex > 0)
        interCtxIdx_ += azimuthSpeedIndex + 1;
    else{
        if (predIdx != 0){
            interCtxIdx = 1;
            interCtxIdx_ = 1;
        }
    }
}
```

The selection of contexts based on reconstructed radius (descried above) may also be updated as follows:

To code whether resPhi=0 or abs(resPhi)=1, following contexts are used:
  a. The prediction mode (inter or intra) of the node; and
  b. Whether the predictor index of the node equals to zero.
  c. whether radius changes dramatically when parsing_independent_of_reconstruction_flag is 0

To code the value of abs(resPhi)−2 with exp-Golomb coding, following contexts are used:
  a. The prediction mode (inter or intra) of the node;
  b. whether boundPhi-3>6 when parsing_independent_of_reconstruction_flag is 0;
  c. whether radius changes dramatically when parsing_independent_of_reconstruction_flag is 0
  d. count of coded bins in prefix or suffix of exp-Golomb codeNum.

In some examples, the dependence of parsing on the reconstruction of the radius, or other components is removed. With this removal, the parsing of azimuth (and other syntax elements) can be performed independently of the decoding/reconstruction of the bitstream as described above.

Figure 22:
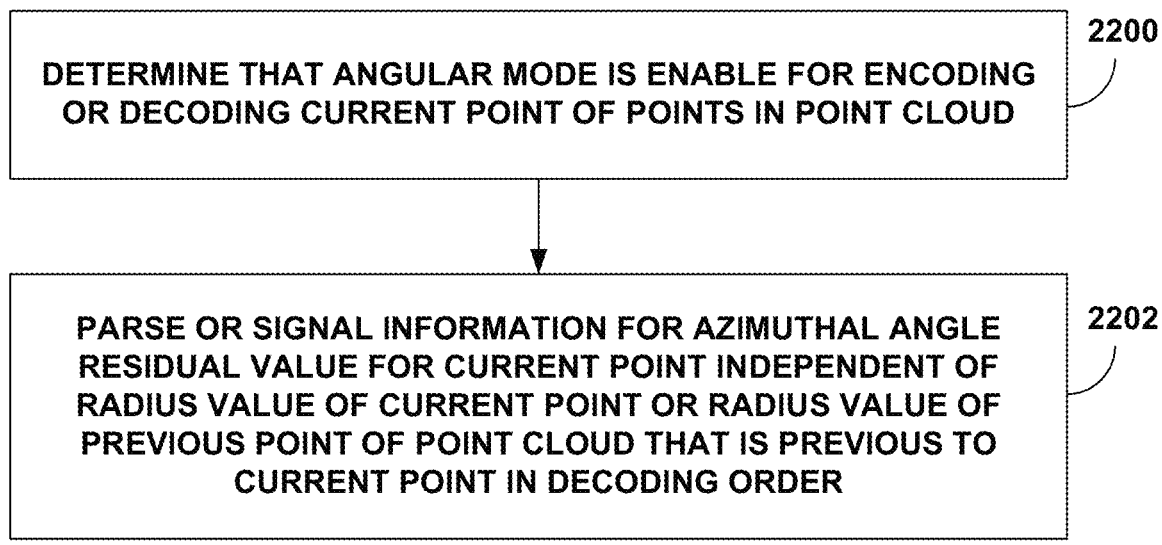
FIG. 22 is a flowchart illustrating an example method in accordance with one or more examples described in this disclosure.

FIG. 22 is a flowchart illustrating an example method in accordance with one or more examples described in this disclosure. In one or more examples, point cloud encoder 200 or point cloud decoder 300 may determine that angular mode is enabled for encoding or decoding a current point of points in the point cloud (2200). For instance, point cloud encoder 200 may signal and point cloud decoder 300 may parse syntax element(s) that indicate that angular mode is enabled. There may be other ways in which to determine that angular mode is enabled.

Point cloud decoder 300 may parse and point cloud encoder 200 may signal information for an azimuthal angle residual value for the current point independent of a radius value of the current point or a radius value of a previous point of the point cloud that is previous to the current point in decoding order (2202). The azimuthal angle residual value may be based on a difference between an azimuthal angle value of the current point and a predictor azimuthal angle value of the current point, and the azimuthal angle value of the current point may be indicative an azimuthal angle of the current point based on a laser (e.g., relative to a LiDAR system that uses the laser or relative to the laser) used to capture the points of the point cloud.

As one example, to parse or signal the information for the azimuthal angle residual value for the current point independent of the radius value of the current point or the radius value of the previous point of the point cloud, point cloud decoder 300 may parse or point cloud encoder 200 may signal the information for the azimuthal angle residual value independent of whether a condition that is based on the radius value of the current point or the radius value of the previous point is satisfied. That is, there may not need to be a determination of whether boundPhi (i.e., B or phiBound) is equal to 0 or equal to 1. However, in some other techniques, such as those illustrated in FIG. 17, whether the azimuthal angle residual value is signaled or parsed is conditioned on the value of boundPhi.

In one or more examples, the parsing or signaling the information for the azimuthal angle residual value may include parsing, from a bitstream, the information for the azimuthal angle residual value. In such examples, point cloud decoder 300 may determine the azimuthal angle residual value based on the information for the azimuthal angle residual value, and reconstruct the point cloud based on the azimuthal angle residual value. A device that includes point cloud decoder 300 may include a display to present imagery based on the point cloud.

In one or more examples, a device that includes point cloud encoder 200 may be configured to generate the point cloud using the laser to capture the points of the point cloud. In such examples, parsing or signaling the information for the azimuthal angle residual value may include point cloud encoder 200 signaling, in a bitstream, the information for the azimuthal angle residual value.

Figure 23:
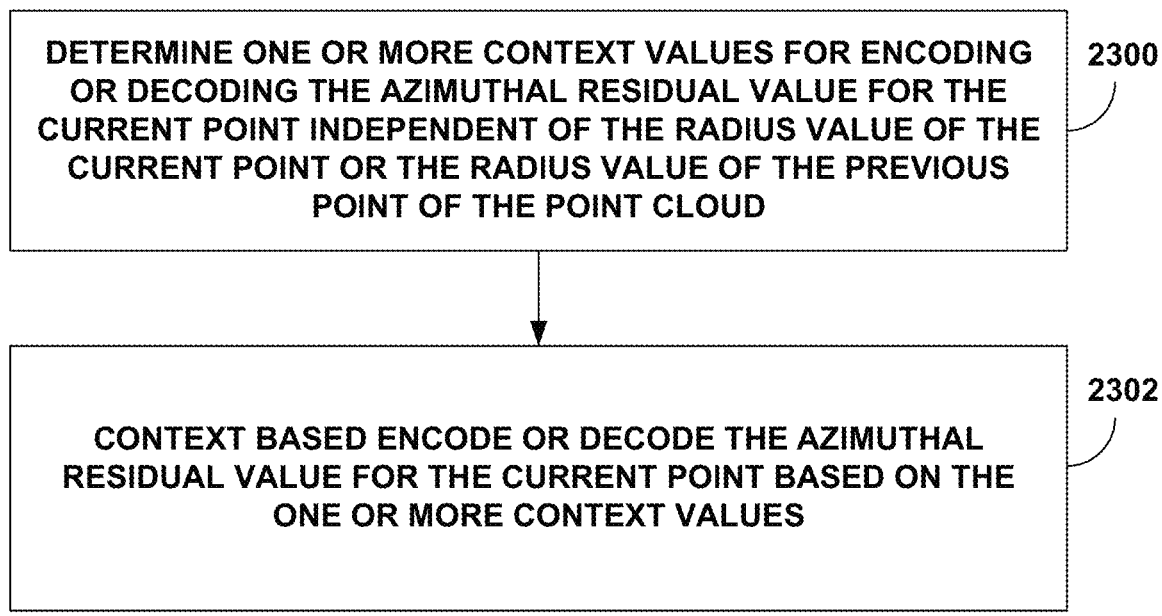
FIG. 23 is a flowchart illustrating an example method in accordance with one or more examples described in this disclosure.

FIG. 23 is a flowchart illustrating an example method in accordance with one or more examples described in this disclosure. Point cloud encoder 200 and point cloud decoder 300 may determine one or more context values for encoding or decoding the azimuthal angle residual value for the current point independent of the radius value of the current point or the radius value of the previous point of the point cloud (2300). For instance, the determination of context values, such as ctxResPhiGTOne[interCtxIdx][ctxL]), ctxResPhiExpGolombPre[interEGkCtxIdx], or ctxResPhiExpGolombSuf[interEGkCtxIdx], may not be based on boundPhi. Point cloud encoder 200 and point cloud decoder 300 may context based encode or decode the azimuthal angle residual value for the current point based on the one or more context values (2302).

Figure 24:
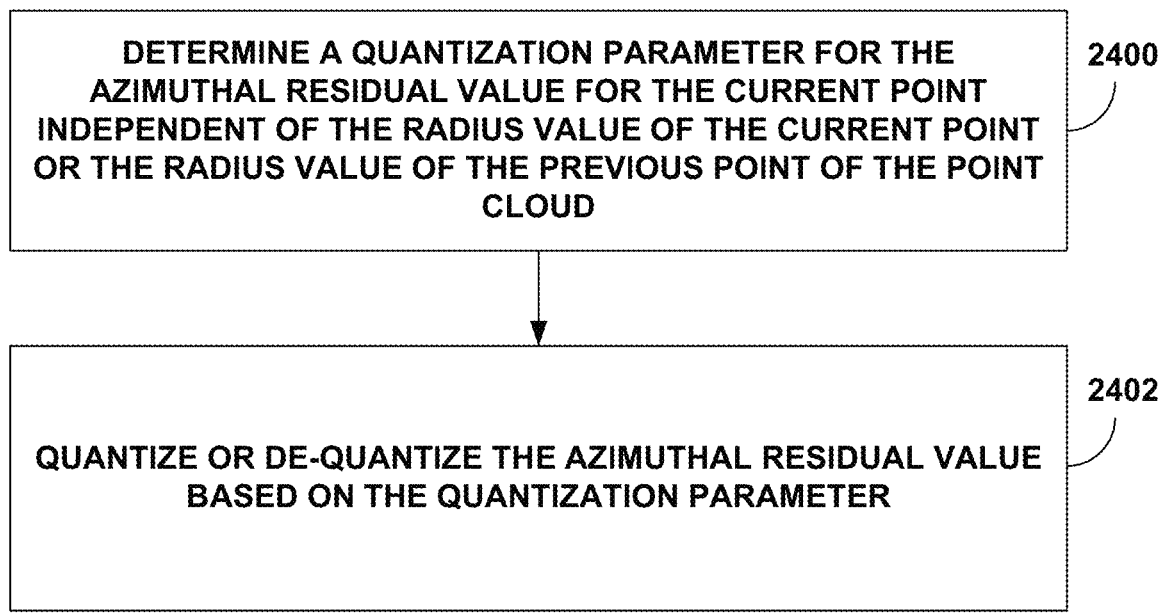
FIG. 24 is a flowchart illustrating an example method in accordance with one or more examples described in this disclosure.

FIG. 24 is a flowchart illustrating an example method in accordance with one or more examples described in this disclosure. Point cloud encoder 200 and point cloud decoder 300 may determine a quantization parameter for the azimuthal angle residual value for the current point independent of the radius value of the current point or the radius value of the previous point of the point cloud (2400). Point cloud encoder 200 and point cloud decoder 300 may quantize or de-quantize the azimuthal angle residual value based on the quantization parameter (2402). This way, the dependency of the quantization parameter from the radius value of the current point or the radius value of a previous point is removed.

Figure 25:
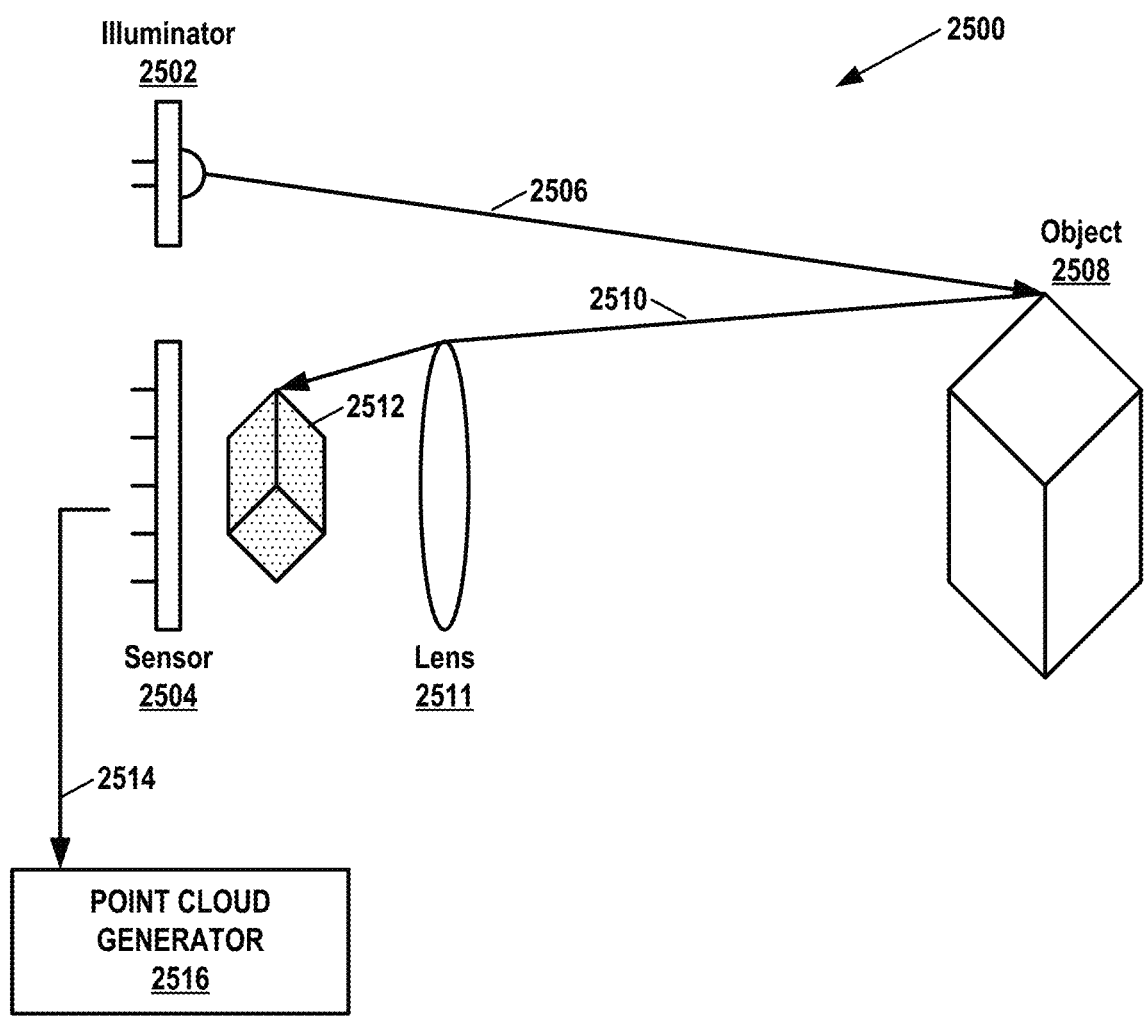
FIG. 25 is a conceptual diagram illustrating an example range-finding system that may be used with one or more techniques of this disclosure.

FIG. 25 is a conceptual diagram illustrating an example range-finding system 2500 that may be used with one or more techniques of this disclosure. In the example of FIG. 25, range-finding system 2500 includes an illuminator 2502 and a sensor 2504. Illuminator 2502 may emit light 2506. In some examples, illuminator 2502 may emit light 2506 as one or more laser beams. Light 2506 may be in one or more wavelengths, such as an infrared wavelength or a visible light wavelength. In other examples, light 2506 is not coherent, laser light. When light 2506 encounters an object, such as object 2508, light 2506 creates returning light 2510. Returning light 2510 may include backscattered and/or reflected light. Returning light 2510 may pass through a lens 2511 that directs returning light 2510 to create an image 2512 of object 2508 on sensor 2504. Sensor 2504 generates signals 2514 based on image 2512. Image 2512 may comprise a set of points (e.g., as represented by dots in image 2512 of FIG. 25).

In some examples, illuminator 2502 and sensor 2504 may be mounted on a spinning structure so that illuminator 2502 and sensor 2504 capture a 360-degree view of an environment (e.g., a spinning LIDAR sensor). In other examples, range-finding system 2500 may include one or more optical components (e.g., mirrors, collimators, diffraction gratings, etc.) that enable illuminator 2502 and sensor 2504 to detect ranges of objects within a specific range (e.g., up to 360-degrees). Although the example of FIG. 25 only shows a single illuminator 2502 and sensor 2504, range-finding system 2500 may include multiple sets of illuminators and sensors.

In some examples, illuminator 2502 generates a structured light pattern. In such examples, range-finding system 2500 may include multiple sensors 2504 upon which respective images of the structured light pattern are formed. Range-finding system 2500 may use disparities between the images of the structured light pattern to determine a distance to an object 2508 from which the structured light pattern backscatters. Structured light-based range-finding systems may have a high level of accuracy (e.g., accuracy in the sub-millimeter range), when object 2508 is relatively close to sensor 2504 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 2500 is a time of flight (ToF)-based system. In some examples where range-finding system 2500 is a ToF-based system, illuminator 2502 generates pulses of light. In other words, illuminator 2502 may modulate the amplitude of emitted light 2506. In such examples, sensor 2504 detects returning light 2510 from the pulses of light 2506 generated by illuminator 2502. Range-finding system 2500 may then determine a distance to object 2508 from which light 2506 backscatters based on a delay between when light 2506 was emitted and detected and the known speed of light in air). In some examples, rather than (or in addition to) modulating the amplitude of the emitted light 2506, illuminator 2502 may modulate the phase of the emitted light 2506. In such examples, sensor 2504 may detect the phase of returning light 2510 from object 2508 and determine distances to points on object 2508 using the speed of light and based on time differences between when illuminator 2502 generated light 2506 at a specific phase and when sensor 2504 detected returning light 2510 at the specific phase.

In other examples, a point cloud may be generated without using illuminator 2502. For instance, in some examples, sensors 2504 of range-finding system 2500 may include two or more optical cameras. In such examples, range-finding system 2500 may use the optical cameras to capture stereo images of the environment, including object 2508. Range-finding system 2500 may include a point cloud generator 2516 that may calculate the disparities between locations in the stereo images. Range-finding system 2500 may then use the disparities to determine distances to the locations shown in the stereo images. From these distances, point cloud generator 2516 may generate a point cloud.

Sensors 2504 may also detect other attributes of object 2508, such as color and reflectance information. In the example of FIG. 25, a point cloud generator 2516 may generate a point cloud based on signals 2514 generated by sensor 2504. Range-finding system 2500 and/or point cloud generator 2516 may form part of data source 104 (FIG. 1). Hence, a point cloud generated by range-finding system 2500 may be encoded and/or decoded according to any of the techniques of this disclosure.

Figure 26:
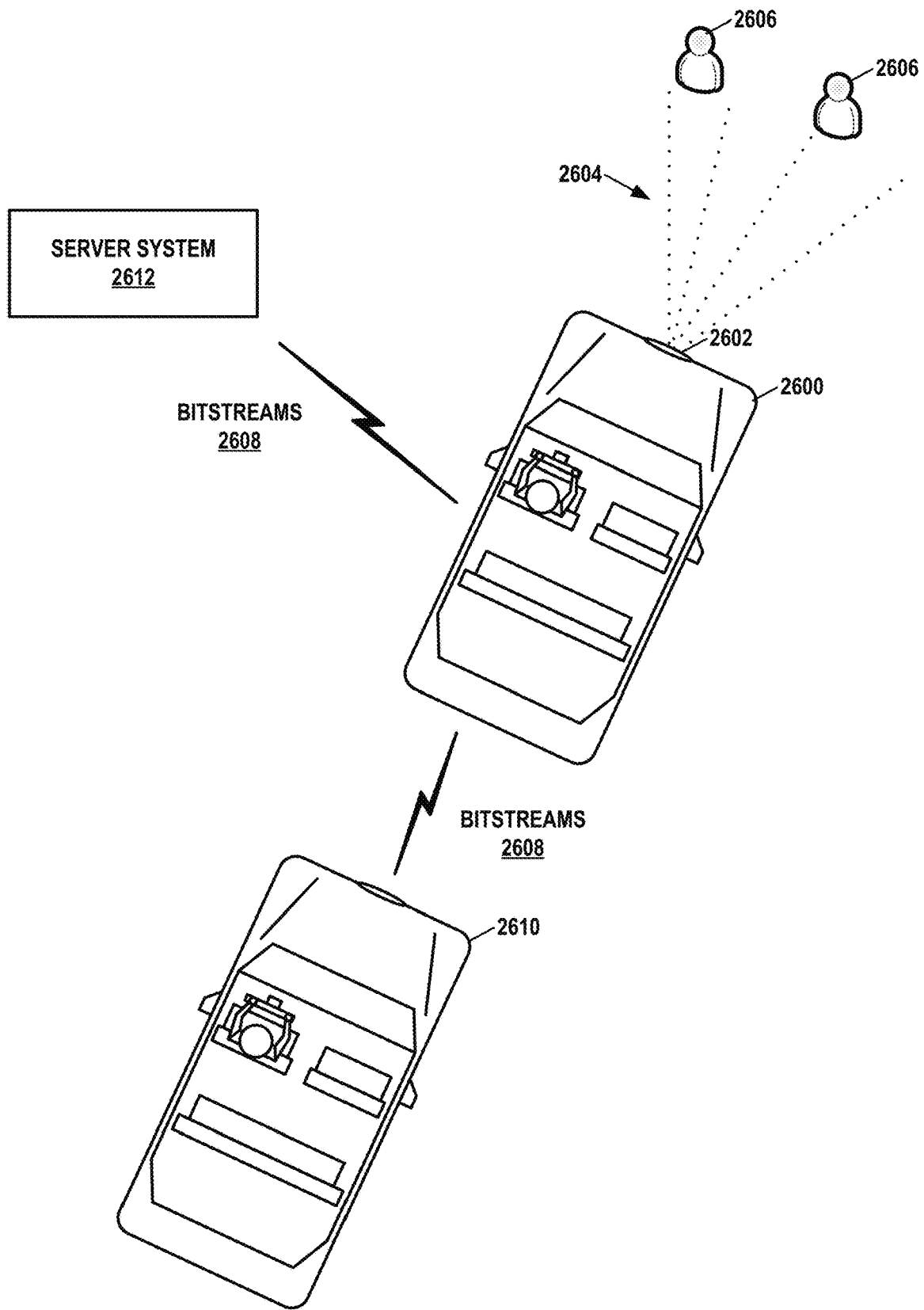
FIG. 26 is a conceptual diagram illustrating an example vehicle-based scenario in which one or more techniques of this disclosure may be used.

FIG. 26 is a conceptual diagram illustrating an example vehicle-based scenario in which one or more techniques of this disclosure may be used. In the example of FIG. 26, a vehicle 2600 includes a range-finding system 2602. Range-finding system 2602 may be implemented in the manner discussed with respect to FIG. 26. Although not shown in the example of FIG. 26, vehicle 2600 may also include a data source, such as data source 104 (FIG. 1), and a G-PCC encoder, such as point cloud encoder 200 (FIG. 1). In the example of FIG. 26, range-finding system 2602 emits laser beams 2604 that reflect off pedestrians 2606 or other objects in a roadway. The data source of vehicle 2600 may generate a point cloud based on signals generated by range-finding system 2602. The G-PCC encoder of vehicle 2600 may encode the point cloud to generate bitstreams 2608, such as geometry bitstream 203 (FIG. 2) and attribute bitstream 205 (FIG. 2). Inter prediction and residual prediction, as described in this disclosure may reduce the size of the geometry bitstream. Bitstreams 2608 may include many fewer bits than the unencoded point cloud obtained by the G-PCC encoder.

An output interface of vehicle 2600 (e.g., output interface 108 (FIG. 1) may transmit bitstreams 2608 to one or more other devices. Bitstreams 2608 may include many fewer bits than the unencoded point cloud obtained by the G-PCC encoder. Thus, vehicle 2600 may be able to transmit bitstreams 2608 to other devices more quickly than the unencoded point cloud data. Additionally, bitstreams 2608 may require less data storage capacity on a device.

In the example of FIG. 26, vehicle 2600 may transmit bitstreams 2608 to another vehicle 2610. Vehicle 2610 may include a G-PCC decoder, such as point cloud decoder 300 (FIG. 1). The G-PCC decoder of vehicle 2610 may decode bitstreams 2608 to reconstruct the point cloud. Vehicle 2610 may use the reconstructed point cloud for various purposes. For instance, vehicle 2610 may determine based on the reconstructed point cloud that pedestrians 2606 are in the roadway ahead of vehicle 2600 and therefore start slowing down, e.g., even before a driver of vehicle 2610 realizes that pedestrians 2606 are in the roadway. Thus, in some examples, vehicle 2610 may perform an autonomous navigation operation based on the reconstructed point cloud.

Additionally or alternatively, vehicle 2600 may transmit bitstreams 2608 to a server system 2612. Server system 2612 may use bitstreams 2608 for various purposes. For example, server system 2612 may store bitstreams 2608 for subsequent reconstruction of the point clouds. In this example, server system 2612 may use the point clouds along with other data (e.g., vehicle telemetry data generated by vehicle 2600) to train an autonomous driving system. In other example, server system 2612 may store bitstreams 2608 for subsequent reconstruction for forensic crash investigations.

Figure 27:
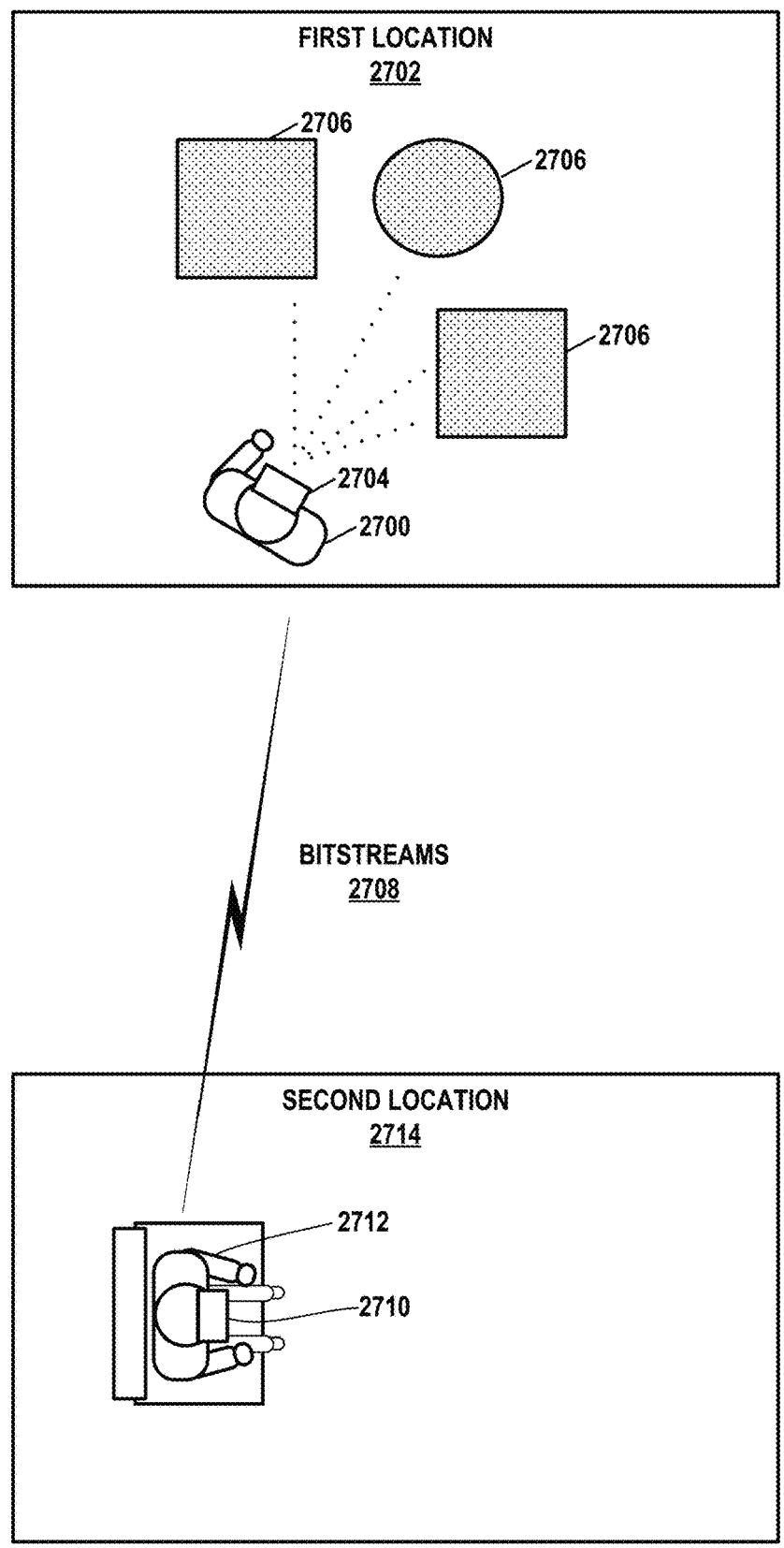
FIG. 27 is a conceptual diagram illustrating an example extended reality system in which one or more techniques of this disclosure may be used.

FIG. 27 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 27, a user 2700 is located in a first location 2702. User 2700 wears an XR headset 2704. As an alternative to XR headset 2704, user 2700 may use a mobile device (e.g., mobile phone, tablet computer, etc.). XR headset 2704 includes a depth detection sensor, such as a range-finding system, that detects positions of points on objects 2706 at location 2702. A data source of XR headset 2704 may use the signals generated by the depth detection sensor to generate a point cloud representation of objects 2706 at location 2702. XR headset 2704 may include a G-PCC encoder (e.g., point cloud encoder 200 of FIG. 1) that is configured to encode the point cloud to generate bitstreams 2708. Inter prediction and residual prediction, as described in this disclosure may reduce the size of bitstream 2708.

XR headset 2704 may transmit bitstreams 2708 (e.g., via a network such as the Internet) to an XR headset 2710 worn by a user 2712 at a second location 2714. XR headset 2710 may decode bitstreams 2708 to reconstruct the point cloud. XR headset 2710 may use the point cloud to generate an XR visualization (e.g., an AR, MR, VR visualization) representing objects 2706 at location 2702. Thus, in some examples, such as when XR headset 2710 generates an VR visualization, user 2712 may have a 3D immersive experience of location 2702. In some examples, XR headset 2710 may determine a position of a virtual object based on the reconstructed point cloud. For instance, XR headset 2710 may determine, based on the reconstructed point cloud, that an environment (e.g., location 2702) includes a flat surface and then determine that a virtual object (e.g., a cartoon character) is to be positioned on the flat surface. XR headset 2710 may generate an XR visualization in which the virtual object is at the determined position. For instance, XR headset 2710 may show the cartoon character sitting on the flat surface.

Figure 28:
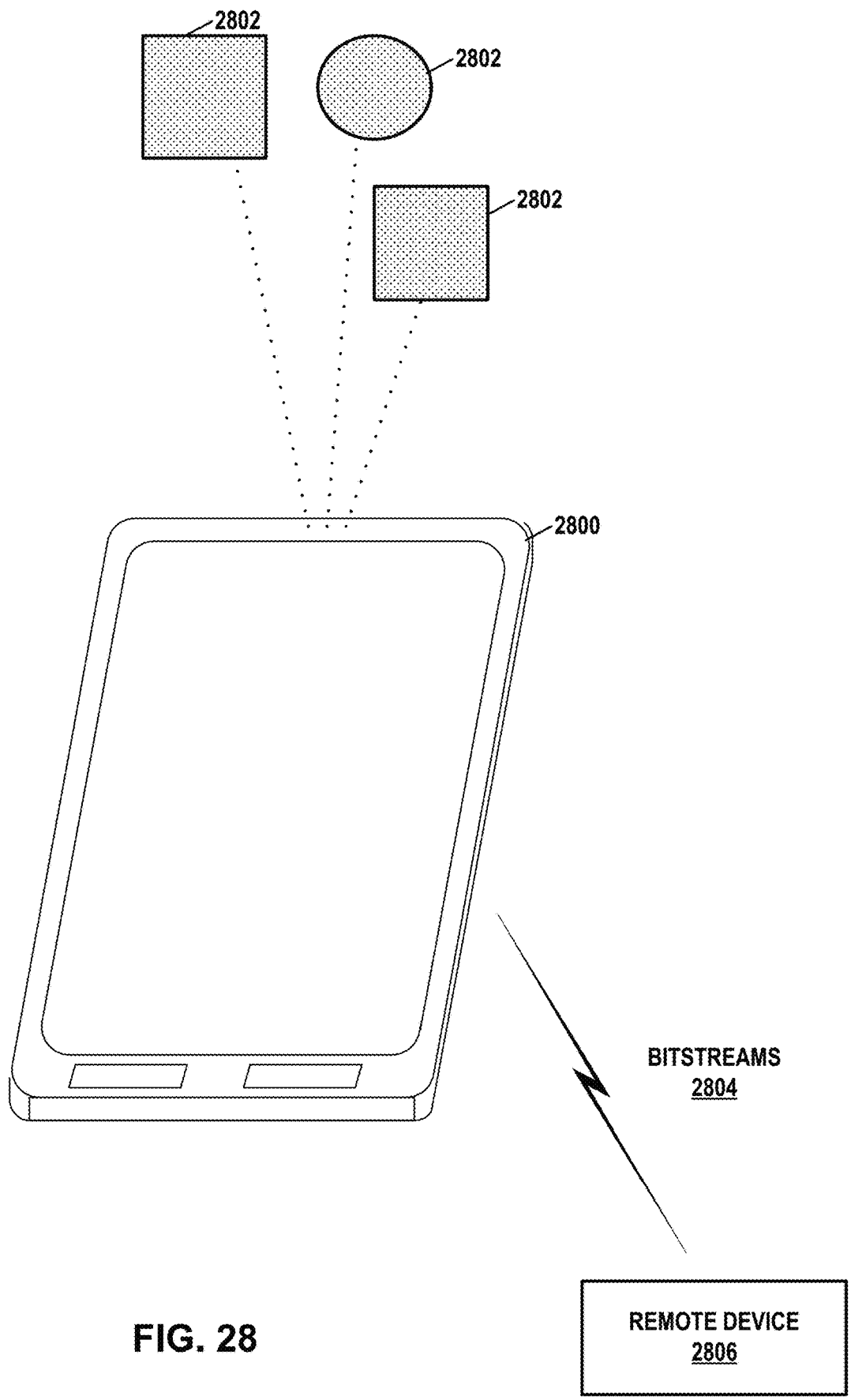
FIG. 28 is a conceptual diagram illustrating an example mobile device system in which one or more techniques of this disclosure may be used.

FIG. 28 is a conceptual diagram illustrating an example mobile device system in which one or more techniques of this disclosure may be used. In the example of FIG. 28, a mobile device 2800 (e.g., a wireless communication device), such as a mobile phone or tablet computer, includes a range-finding system, such as a LIDAR system, that detects positions of points on objects 2802 in an environment of mobile device 2800. A data source of mobile device 2800 may use the signals generated by the depth detection sensor to generate a point cloud representation of objects 2802. Mobile device 2800 may include a G-PCC encoder (e.g., point cloud encoder 200 of FIG. 1) that is configured to encode the point cloud to generate bitstreams 2804. In the example of FIG. 2, mobile device 2800 may transmit bitstreams to a remote device 2806, such as a server system or other mobile device. Inter prediction and residual prediction, as described in this disclosure may reduce the size of bitstreams 2804. Remote device 2806 may decode bitstreams 2804 to reconstruct the point cloud. Remote device 2806 may use the point cloud for various purposes. For example, remote device 2806 may use the point cloud to generate a map of environment of mobile device 2800. For instance, remote device 2806 may generate a map of an interior of a building based on the reconstructed point cloud. In another example, remote device 2806 may generate imagery (e.g., computer graphics) based on the point cloud. For instance, remote device 2806 may use points of the point cloud as vertices of polygons and use color attributes of the points as the basis for shading the polygons. In some examples, remote device 2806 may use the reconstructed point cloud for facial recognition or other security applications.

Examples in the various aspects of this disclosure may be used individually or in any combination.

Clause 1. A method of processing a point cloud, the method comprising: parsing or signaling a syntax element specifying whether determining of azimuth residual is independent of values of reconstructed syntax elements for the point cloud.

Clause 2. The method of clause 1, further comprising determining the azimuth residual independent on the values of the reconstructed syntax elements in the condition that the syntax element specifies that determining of the azimuth residual is independent of values of reconstructed syntax elements.

Clause 3. The method of any of clauses 1 and 2, wherein the values of the reconstructed syntax elements comprises at least one of reconstructed radius of current or preceding points of the point cloud.

Clause 4. A method of processing a point cloud, the method comprising: parsing or signaling a syntax element specifying whether determining of syntax structures is independent of determining one or more components of one or more points in the point cloud.

Clause 5. The method of clause 4, further comprising determining the syntax structures independent of decoding or reconstructing the one or more points in the condition that the syntax element specifies that determining of the syntax structures is independent of determining one or more components of one or more points in the point cloud.

Clause 6. The method of any of clauses 4 and 5, wherein the syntax structure comprise at least one of a slice or brick.

Clause 7. The method of any of clauses 1-6, further comprising generating the point cloud.

Clause 8. A device for processing a point cloud, the device comprising: memory configured to store the point cloud; and one or more processors implement in circuitry and configured to perform the method of any of clauses 1-7.

Clause 9. The device of clause 8, wherein the device comprises a decoder.

Clause 10. The device of clause 8, wherein the device comprises an encoder.

Clause 11. The device of any of clauses 8-10, wherein the one or more processors are configured to generate the point cloud.

Clause 12. The device of any of clauses 8-11, further comprising a display to present imagery based on the point cloud.

Clause 13. A computer-readable storage medium having stored thereon instructions that, when executed, cause one or more processors to perform the method of any of clauses 1-7.

Clause 14. A device for processing a point cloud, the device comprising means for performing the method of any of clauses 1-7.

Clause 1A. A method of processing a point cloud, the method comprising: determining that angular mode is enabled for encoding or decoding a current point of points in the point cloud; and parsing or signaling information for an azimuthal angle residual value for the current point independent of a radius value of the current point or a radius value of a previous point of the point cloud that is previous to the current point in decoding order, wherein the azimuthal angle residual value is based on a difference between an azimuthal angle value of the current point and a predictor azimuthal angle value of the current point, and wherein the azimuthal angle value of the current point is indicative an azimuthal angle of the current point based on a laser used to capture the points of the point cloud.

Clause 2A. The method of clause 1A, wherein parsing or signaling the information for the azimuthal angle residual value for the current point independent of the radius value of the current point or the radius value of the previous point of the point cloud comprises parsing or signaling the information for the azimuthal angle residual value independent of whether a condition that is based on the radius value of the current point or the radius value of the previous point is satisfied.

Clause 3A. The method of any of clauses 1A or 2A, further comprising: determining one or more context values for encoding or decoding the azimuthal angle residual value for the current point independent of the radius value of the current point or the radius value of the previous point of the point cloud; and context based encoding or decoding the azimuthal angle residual value for the current point based on the one or more context values.

Clause 4A. The method of any of clauses 1A-3A, further comprising: determining a quantization parameter for the azimuthal angle residual value for the current point independent of the radius value of the current point or the radius value of the previous point of the point cloud; and quantizing or de-quantizing the azimuthal angle residual value based on the quantization parameter.

Clause 5A. The method of any of clauses 1A-4A, wherein parsing or signaling the information for the azimuthal angle residual value comprises parsing, from a bitstream, the information for the azimuthal angle residual value, the method further comprising: determining the azimuthal angle residual value based on the information for the azimuthal angle residual value; and reconstructing the point cloud based on the azimuthal angle residual value.

Clause 6A. The method of any of clauses 1A-5A, further comprising: generating the point cloud using the laser to capture the points of the point cloud, wherein parsing or signaling the information for the azimuthal angle residual value comprises signaling, in a bitstream, the information for the azimuthal angle residual value.

Clause 7A. A device for processing a point cloud, the device comprising: one or more memories configured to store the point cloud; and one or more processors implemented in circuitry and configured to: determine that angular mode is enabled for encoding or decoding a current point of points in the point cloud; and parse or signal information for an azimuthal angle residual value for the current point independent of a radius value of the current point or a radius value of a previous point of the point cloud that is previous to the current point in decoding order, wherein the azimuthal angle residual value is based on a difference between an azimuthal angle value of the current point and a predictor azimuthal angle value of the current point, and wherein the azimuthal angle value of the current point is indicative an azimuthal angle of the current point based on a laser used to capture the points of the point cloud.

Clause 8A. The device of clause 7A, wherein to parse or signal the information for the azimuthal angle residual value for the current point independent of the radius value of the current point or the radius value of the previous point of the point cloud, the one or more processors are configured to parse or signal the information for the azimuthal angle residual value independent of whether a condition that is based on the radius value of the current point or the radius value of the previous point is satisfied.

Clause 9A. The device of any of clauses 7A and 8A, wherein the one or more processors are configured to: determine one or more context values for encoding or decoding the azimuthal angle residual value for the current point independent of the radius value of the current point or the radius value of the previous point of the point cloud; and context based encode or decode the azimuthal angle residual value for the current point based on the one or more context values.

Clause 10A. The device of any of clauses 7A-9A, wherein the one or more processors are configured to: determine a quantization parameter for the azimuthal angle residual value for the current point independent of the radius value of the current point or the radius value of the previous point of the point cloud; and quantize or de-quantize the azimuthal angle residual value based on the quantization parameter.

Clause 11A. The device of any of clauses 7A-10A, wherein to parse or signal the information for the azimuthal angle residual value, the one or more processors are configured to parse, from a bitstream, the information for the azimuthal angle residual value, and wherein the one or more processors are configured to: determine the azimuthal angle residual value based on the information for the azimuthal angle residual value; and reconstruct the point cloud based on the azimuthal angle residual value.

Clause 12A. The device of any of clauses 7A-11A, wherein the one or more processors are configured to: generate the point cloud using the laser to capture the points of the point cloud, wherein to parse or signal the information for the azimuthal angle residual value, the one or more processors are configured to signal, in a bitstream, the information for the azimuthal angle residual value.

Clause 13A. The device of any of clauses 7A-12A, further comprising a display to present imagery based on the point cloud.

Clause 14A. The device of any of clauses 7A-12A, further comprising the laser.

Clause 15A. A computer-readable storage medium storing instructions thereon that when executed cause one or more processors to: determine that angular mode is enabled for encoding or decoding a current point of points in a point cloud; and parse or signal information for an azimuthal angle residual value for the current point independent of a radius value of the current point or a radius value of a previous point of the point cloud that is previous to the current point in decoding order, wherein the azimuthal angle residual value is based on a difference between an azimuthal angle value of the current point and a predictor azimuthal angle value of the current point, and wherein the azimuthal angle value of the current point is indicative an azimuthal angle of the current point based on a laser used to capture the points of the point cloud.

Clause 16A. The computer-readable storage medium of clause 15A, wherein the instructions that cause the one or more processors to parse or signal the information for the azimuthal angle residual value for the current point independent of the radius value of the current point or the radius value of the previous point of the point cloud comprise instructions that cause the one or more processors to parse or signal the information for the azimuthal angle residual value independent of whether a condition that is based on the radius value of the current point or the radius value of the previous point is satisfied.

Clause 17A. The computer-readable storage medium of any of clauses 15A and 16A, further comprising instructions that cause the one or more processors to: determine one or more context values for encoding or decoding the azimuthal angle residual value for the current point independent of the radius value of the current point or the radius value of the previous point of the point cloud; and context based encode or decode the azimuthal angle residual value for the current point based on the one or more context values.

Clause 18A. The computer-readable storage medium of any of clauses 15A-17A, further comprising instructions that cause the one or more processors to: determine a quantization parameter for the azimuthal angle residual value for the current point independent of the radius value of the current point or the radius value of the previous point of the point cloud; and quantize or de-quantize the azimuthal angle residual value based on the quantization parameter.

Clause 19A. The computer-readable storage medium of any of clauses 15A-18A, wherein the instructions that cause the one or more processors to parse or signal the information for the azimuthal angle residual value comprise instructions that cause the one or more processors to parse, from a bitstream, the information for the azimuthal angle residual value, the instructions further comprising instructions that cause the one or more processors to: determine the azimuthal angle residual value based on the information for the azimuthal angle residual value; and reconstruct the point cloud based on the azimuthal angle residual value.

Clause 20A. The computer-readable storage medium of any of clauses 15A-19A, further comprising instructions that cause the one or more processors to: generate the point cloud using the laser to capture the points of the point cloud, wherein the instructions that cause the one or more processors to parse or signal the information for the azimuthal angle residual value comprise instructions that cause the one or more processors to signal, in a bitstream, the information for the azimuthal angle residual value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing a point cloud, the method comprising:
   determining that angular mode is enabled for encoding or decoding a current point of points in the point cloud; and
   parsing or signaling information for an azimuthal angle residual value for the current point independent of a radius value of the current point or a radius value of a previous point of the point cloud that is previous to the current point in decoding order,
   wherein the azimuthal angle residual value is based on a difference between an azimuthal angle value of the current point and a predictor azimuthal angle value of the current point, and
   wherein the azimuthal angle value of the current point is indicative an azimuthal angle of the current point based on a laser used to capture the points of the point cloud.

2. The method of claim 1, wherein parsing or signaling the information for the azimuthal angle residual value for the current point independent of the radius value of the current point or the radius value of the previous point of the point cloud comprises parsing or signaling the information for the azimuthal angle residual value independent of whether a condition that is based on the radius value of the current point or the radius value of the previous point is satisfied.

3. The method of claim 1, further comprising:
   determining one or more context values for encoding or decoding the azimuthal angle residual value for the current point independent of the radius value of the current point or the radius value of the previous point of the point cloud; and
   context based encoding or decoding the azimuthal angle residual value for the current point based on the one or more context values.

4. The method of claim 1, further comprising:
   determining a quantization parameter for the azimuthal angle residual value for the current point independent of the radius value of the current point or the radius value of the previous point of the point cloud; and
   quantizing or de-quantizing the azimuthal angle residual value based on the quantization parameter.

5. The method of claim 1, wherein parsing or signaling the information for the azimuthal angle residual value comprises parsing, from a bitstream, the information for the azimuthal angle residual value, the method further comprising:
   determining the azimuthal angle residual value based on the information for the azimuthal angle residual value; and
   reconstructing the point cloud based on the azimuthal angle residual value.

6. The method of claim 1, further comprising:
   generating the point cloud using the laser to capture the points of the point cloud,
   wherein parsing or signaling the information for the azimuthal angle residual value comprises signaling, in a bitstream, the information for the azimuthal angle residual value.

7. A device for processing a point cloud, the device comprising:
   one or more memories configured to store the point cloud; and
   one or more processors implemented in circuitry and configured to:
      determine that angular mode is enabled for encoding or decoding a current point of points in the point cloud; and
      parse or signal information for an azimuthal angle residual value for the current point independent of a radius value of the current point or a radius value of a previous point of the point cloud that is previous to the current point in decoding order,
      wherein the azimuthal angle residual value is based on a difference between an azimuthal angle value of the current point and a predictor azimuthal angle value of the current point, and
      wherein the azimuthal angle value of the current point is indicative an azimuthal angle of the current point based on a laser used to capture the points of the point cloud.

8. The device of claim 7, wherein to parse or signal the information for the azimuthal angle residual value for the current point independent of the radius value of the current point or the radius value of the previous point of the point cloud, the one or more processors are configured to parse or signal the information for the azimuthal angle residual value independent of whether a condition that is based on the radius value of the current point or the radius value of the previous point is satisfied.

9. The device of claim 7, wherein the one or more processors are configured to:
- determine one or more context values for encoding or decoding the azimuthal angle residual value for the current point independent of the radius value of the current point or the radius value of the previous point of the point cloud; and
- context based encode or decode the azimuthal angle residual value for the current point based on the one or more context values.

10. The device of claim 7, wherein the one or more processors are configured to:
- determine a quantization parameter for the azimuthal angle residual value for the current point independent of the radius value of the current point or the radius value of the previous point of the point cloud; and
- quantize or de-quantize the azimuthal angle residual value based on the quantization parameter.

11. The device of claim 7, wherein to parse or signal the information for the azimuthal angle residual value, the one or more processors are configured to parse, from a bitstream, the information for the azimuthal angle residual value, and wherein the one or more processors are configured to:
- determine the azimuthal angle residual value based on the information for the azimuthal angle residual value; and
- reconstruct the point cloud based on the azimuthal angle residual value.

12. The device of claim 7, wherein the one or more processors are configured to:
- generate the point cloud using the laser to capture the points of the point cloud,
- wherein to parse or signal the information for the azimuthal angle residual value, the one or more processors are configured to signal, in a bitstream, the information for the azimuthal angle residual value.

13. The device of claim 7, further comprising a display to present imagery based on the point cloud.

14. The device of claim 7, further comprising the laser.

15. A computer-readable storage medium storing instructions thereon that when executed cause one or more processors to:
- determine that angular mode is enabled for encoding or decoding a current point of points in a point cloud; and
- parse or signal information for an azimuthal angle residual value for the current point independent of a radius value of the current point or a radius value of a previous point of the point cloud that is previous to the current point in decoding order,
- wherein the azimuthal angle residual value is based on a difference between an azimuthal angle value of the current point and a predictor azimuthal angle value of the current point, and
- wherein the azimuthal angle value of the current point is indicative an azimuthal angle of the current point based on a laser used to capture the points of the point cloud.

16. The computer-readable storage medium of claim 15, wherein the instructions that cause the one or more processors to parse or signal the information for the azimuthal angle residual value for the current point independent of the radius value of the current point or the radius value of the previous point of the point cloud comprise instructions that cause the one or more processors to parse or signal the information for the azimuthal angle residual value independent of whether a condition that is based on the radius value of the current point or the radius value of the previous point is satisfied.

17. The computer-readable storage medium of claim 15, further comprising instructions that cause the one or more processors to:
- determine one or more context values for encoding or decoding the azimuthal angle residual value for the current point independent of the radius value of the current point or the radius value of the previous point of the point cloud; and
- context based encode or decode the azimuthal angle residual value for the current point based on the one or more context values.

18. The computer-readable storage medium of claim 15, further comprising instructions that cause the one or more processors to:
- determine a quantization parameter for the azimuthal angle residual value for the current point independent of the radius value of the current point or the radius value of the previous point of the point cloud; and
- quantize or de-quantize the azimuthal angle residual value based on the quantization parameter.

19. The computer-readable storage medium of claim 15, wherein the instructions that cause the one or more processors to parse or signal the information for the azimuthal angle residual value comprise instructions that cause the one or more processors to parse, from a bitstream, the information for the azimuthal angle residual value, the instructions further comprising instructions that cause the one or more processors to:
- determine the azimuthal angle residual value based on the information for the azimuthal angle residual value; and
- reconstruct the point cloud based on the azimuthal angle residual value.

20. The computer-readable storage medium of claim 15, further comprising instructions that cause the one or more processors to:
- generate the point cloud using the laser to capture the points of the point cloud,
- wherein the instructions that cause the one or more processors to parse or signal the information for the azimuthal angle residual value comprise instructions that cause the one or more processors to signal, in a bitstream, the information for the azimuthal angle residual value.

* * * * *